(12) United States Patent
Chundrlik et al.

(10) Patent No.: US 10,055,651 B2
(45) Date of Patent: Aug. 21, 2018

(54) VEHICLE VISION SYSTEM WITH ENHANCED LANE TRACKING

(71) Applicant: MAGNA ELECTRONICS INC., Auburn Hills, MI (US)

(72) Inventors: William J. Chundrlik, Rochester Hills, MI (US); Dominik Raudszus, Aachen (DE); Christopher L. Van Dan Elzen, Rochester, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/446,221

(22) Filed: Mar. 1, 2017

(65) Prior Publication Data
US 2017/0262712 A1    Sep. 14, 2017

Related U.S. Application Data

(60) Provisional application No. 62/305,216, filed on Mar. 8, 2016.

(51) Int. Cl.
*G06K 9/00* (2006.01)
*B60R 1/00* (2006.01)
*G08G 1/16* (2006.01)

(52) U.S. Cl.
CPC ............ *G06K 9/00798* (2013.01); *B60R 1/00* (2013.01); *G08G 1/166* (2013.01); *G08G 1/167* (2013.01); *B60R 2300/302* (2013.01); *B60R 2300/804* (2013.01); *B60R 2300/8093* (2013.01)

(58) Field of Classification Search
CPC ................ B60R 1/00; B60R 2300/302; B60R 2300/804; B60R 2300/8093; G06K 9/00798; G08G 1/166; G08G 1/167
USPC ......................................................... 382/104
See application file for complete search history.

(56) References Cited

U.S. PATENT DOCUMENTS

| | | |
|---|---|---|
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,289,182 A | 2/1994 | Brillard et al. |
| 5,289,321 A | 2/1994 | Secor |

(Continued)

*Primary Examiner* — Manuchehr Rahmjoo
(74) *Attorney, Agent, or Firm* — Honigman Miller Schwartz and Cohn, LLP

(57) ABSTRACT

A driver assistance system for a vehicle includes a camera disposed at a vehicle and having a field of view forward of the vehicle. A control includes an image processor that is operable to process image data captured by the camera. Responsive to processing by the image processor of image data captured by the camera, the image processor is operable to determine lane markings demarcating the lane in which the vehicle is traveling. Responsive to processing by the image processor of captured image data and responsive to at least one of (i) a map input and (ii) a location input, the control estimates a path of travel for the vehicle to maintain the vehicle in the lane in which the vehicle is traveling in situations where the lane markings demarcating the lane in which the vehicle is traveling are not readily determinable.

9 Claims, 32 Drawing Sheets

Use Case 3: Curvature Error

- Error in camera lane curvature

(56) References Cited

U.S. PATENT DOCUMENTS

| | | |
|---|---|---|
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,410,346 A | 4/1995 | Saneyoshi et al. |
| 5,414,257 A | 5/1995 | Stanton |
| 5,414,461 A | 5/1995 | Kishi et al. |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,929,786 A | 7/1999 | Schofield et al. |
| 5,949,331 A | 9/1999 | Schofield et al. |
| 5,959,555 A | 9/1999 | Furuta |
| 5,963,247 A | 10/1999 | Banitt |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,097,024 A | 8/2000 | Stam et al. |
| 6,144,022 A | 11/2000 | Tenenbaum et al. |
| 6,175,300 B1 | 1/2001 | Kendrick |
| 6,178,034 B1 | 1/2001 | Allemand et al. |
| 6,185,492 B1 | 2/2001 | Kagawa et al. |
| 6,223,114 B1 | 4/2001 | Boros et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,420,975 B1 | 7/2002 | DeLine et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,487,501 B1 | 11/2002 | Jeon |
| 6,497,503 B1 | 12/2002 | Dassanayake et al. |
| 6,498,620 B2 | 12/2002 | Schofield et al. |
| 6,516,664 B2 | 2/2003 | Lynam |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,636,258 B2 | 10/2003 | Strumolo |
| 6,672,731 B2 | 1/2004 | Schnell et al. |
| 6,678,614 B2 | 1/2004 | McCarthy et al. |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,711,474 B1 | 3/2004 | Treyz et al. |
| 6,714,331 B2 | 3/2004 | Lewis et al. |
| 6,735,506 B2 | 5/2004 | Breed et al. |

(56) References Cited

U.S. PATENT DOCUMENTS

| | | |
|---|---|---|
| 6,744,353 B2 | 6/2004 | Sjönell |
| 6,762,867 B2 | 7/2004 | Lippert et al. |
| 6,795,221 B1 | 9/2004 | Urey |
| 6,802,617 B2 | 10/2004 | Schofield et al. |
| 6,806,452 B2 | 10/2004 | Bos et al. |
| 6,819,231 B2 | 11/2004 | Berberich et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,167,796 B2 | 1/2007 | Taylor et al. |
| 7,195,381 B2 | 3/2007 | Lynam et al. |
| 7,202,776 B2 | 4/2007 | Breed |
| 7,205,904 B2 | 4/2007 | Schofield |
| 7,227,459 B2 | 6/2007 | Bos et al. |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,355,524 B2 | 4/2008 | Schofield |
| 7,355,526 B2 | 4/2008 | Huang |
| 7,380,948 B2 | 6/2008 | Schofield et al. |
| 7,388,182 B2 | 6/2008 | Schofield et al. |
| 7,400,236 B2 | 7/2008 | Kade et al. |
| 7,424,364 B2 | 9/2008 | Gern et al. |
| 7,425,076 B2 | 9/2008 | Schofield et al. |
| 7,446,650 B2 | 11/2008 | Schofield et al. |
| 7,460,951 B2 | 12/2008 | Altan |
| 7,480,149 B2 | 1/2009 | DeWard et al. |
| 7,490,007 B2 | 2/2009 | Taylor et al. |
| 7,492,281 B2 | 2/2009 | Lynam et al. |
| 7,510,038 B2 | 3/2009 | Kauffmann et al. |
| 7,526,103 B2 | 4/2009 | Schofield et al. |
| 7,532,981 B2 | 5/2009 | Kataoka |
| 7,561,032 B2 | 7/2009 | Huang et al. |
| 7,561,181 B2 | 7/2009 | Schofield et al. |
| 7,581,859 B2 | 9/2009 | Lynam |
| 7,592,928 B2 | 9/2009 | Chinomi et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,681,960 B2 | 3/2010 | Wanke et al. |
| 7,711,464 B2 | 5/2010 | Kaufmann |
| 7,720,580 B2 | 5/2010 | Higgins-Luthman |
| 7,777,611 B2 | 8/2010 | Desai |
| 7,881,496 B2 | 2/2011 | Camilleri et al. |
| 7,885,730 B2 | 2/2011 | Kauffmann et al. |
| 7,914,187 B2 | 3/2011 | Higgins-Luthman et al. |
| 8,027,029 B2 | 9/2011 | Lu et al. |
| 8,164,628 B2 | 4/2012 | Stein |
| 8,670,903 B2 | 3/2014 | Lee et al. |
| 8,694,224 B2 | 4/2014 | Chundrlik, Jr. et al. |
| 8,818,606 B2 | 8/2014 | Lee et al. |
| 8,930,081 B2 | 1/2015 | Bolourchi |
| 8,965,633 B2 | 2/2015 | Lee et al. |
| 9,120,486 B1 | 9/2015 | Mallinger |
| 9,180,908 B2 | 11/2015 | Van Dan Elzen et al. |
| 9,264,673 B2 | 2/2016 | Chundrlik et al. |
| 2002/0113873 A1 | 8/2002 | Williams |
| 2003/0137586 A1 | 7/2003 | Lewellen |
| 2003/0222982 A1 | 12/2003 | Hamdan et al. |
| 2004/0098197 A1 | 5/2004 | Matsumoto |
| 2004/0107035 A1 | 6/2004 | Tange |
| 2004/0114381 A1 | 6/2004 | Salmeen et al. |
| 2004/0128065 A1 | 7/2004 | Taylor et al. |
| 2004/0183663 A1 | 9/2004 | Shimakage |
| 2004/0200948 A1 | 10/2004 | Bos et al. |
| 2004/0230375 A1 | 11/2004 | Matsumoto |
| 2004/0252020 A1 | 12/2004 | Matsumoto |
| 2005/0015203 A1 | 1/2005 | Nishira |
| 2005/0078389 A1 | 4/2005 | Kulas et al. |
| 2005/0107931 A1 | 5/2005 | Shimakage |
| 2005/0125153 A1 | 6/2005 | Matsumoto |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Wildmann et al. |
| 2007/0091173 A1 | 4/2007 | Kade et al. |
| 2007/0104476 A1 | 5/2007 | Yasutomi et al. |
| 2007/0176080 A1 | 8/2007 | Schofield et al. |
| 2008/0061952 A1 | 3/2008 | Maass |
| 2008/0091318 A1 | 4/2008 | Deng et al. |
| 2008/0180529 A1 | 7/2008 | Taylor et al. |
| 2008/0183342 A1 | 7/2008 | Kaufmann et al. |
| 2009/0113509 A1 | 4/2009 | Tseng et al. |
| 2009/0132125 A1 | 5/2009 | Yonezawa |
| 2009/0234553 A1 | 9/2009 | Sekiguchi |
| 2009/0243824 A1 | 10/2009 | Peterson et al. |
| 2009/0244361 A1 | 10/2009 | Gebauer et al. |
| 2009/0299573 A1 | 12/2009 | Thrun et al. |
| 2010/0020170 A1 | 1/2010 | Higgins-Luthman et al. |
| 2010/0045797 A1 | 2/2010 | Schofield et al. |
| 2010/0082195 A1 | 4/2010 | Lee et al. |
| 2010/0097469 A1 | 4/2010 | Blank et al. |
| 2010/0114431 A1 | 5/2010 | Switkes |
| 2010/0121532 A1 | 5/2010 | Urai |
| 2010/0228420 A1 | 9/2010 | Lee |
| 2010/0228437 A1 | 9/2010 | Hanzawa et al. |
| 2010/0231718 A1 | 9/2010 | Nakamori et al. |
| 2010/0295668 A1 | 11/2010 | Kataoka |
| 2011/0231095 A1 | 9/2011 | Nakada |
| 2012/0057757 A1 | 3/2012 | Oyama |
| 2012/0062743 A1 | 3/2012 | Lynam et al. |
| 2012/0221168 A1* | 8/2012 | Zeng .................. G08G 1/09626 701/1 |
| 2012/0316730 A1 | 12/2012 | Zhang et al. |
| 2013/0173115 A1 | 7/2013 | Gunia et al. |
| 2013/0231825 A1 | 9/2013 | Chundrlik, Jr. |
| 2013/0231830 A1 | 9/2013 | Van Dan Elzen et al. |
| 2013/0253767 A1 | 9/2013 | Lee et al. |
| 2014/0176716 A1 | 6/2014 | Wallat |
| 2015/0353085 A1 | 12/2015 | Lee |
| 2016/0046290 A1 | 2/2016 | Aharony et al. |
| 2017/0323493 A1 | 11/2017 | Chundrlik, Jr. et al. |

\* cited by examiner

Use Case 1: Camera Dropout

- Camera loses lane markings for a few seconds

Use Case 2: Intersection Dropout
- Camera loses lane markings for a few seconds at intersections

Use Case 3: Curvature Error

- Error in camera lane curvature

Use Case 4: Exit Ramp

- Camera tracks exit lane instead of correct lane marking

Use Case 1: Camera Dropout Prediction of Lane Heading

- Lane curvature κ can be taken from digital map
- Lane heading α can be predicted based on latest heading from camera before dropout $\alpha_0$, change of lane orientation γ and change of vehicle yaw angle ψ

$$\alpha = \alpha_0 + \gamma + \psi$$

- Change of lane orientation γ can be calculated from curvature κ and velocity v $$\gamma = \int \kappa \cdot v \cdot dt$$

- Change of vehicle yaw angle ψ can be calculated from yaw rate $\dot{\psi}$ $$\psi = \int \dot{\psi} \cdot dt$$

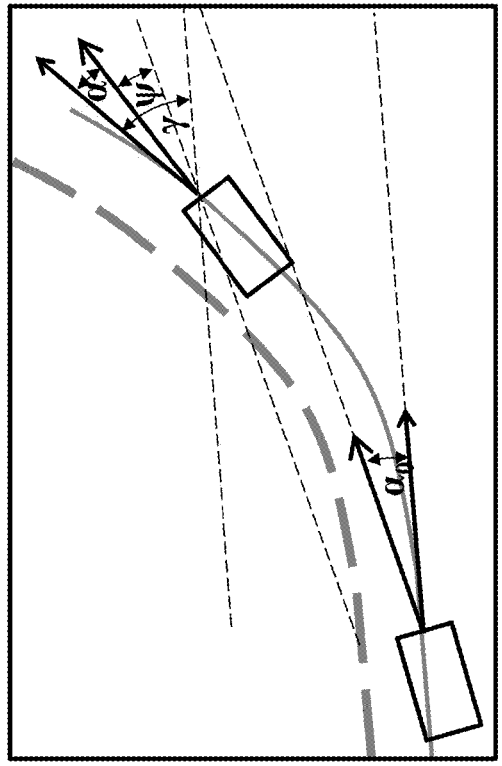

FIG. 12

Use Case 1: Camera Dropout Prediction of Lane Position

- Lane position x can be predicted based on latest valid position from camera before dropout $x_0$, vehicle velocity v and heading angle $\alpha$ $$x = x_0 + \int v \cdot \sin(\alpha) \cdot dt$$

Use Case 2: Intersection Dropout Heading Angle Estimation

Time Update

$$\hat{x}_{k+1}^- = \begin{pmatrix} x_{k+1}^- \\ y_{k+1}^- \\ \psi_{k+1}^- \\ \dot{\psi}_{k+1}^- \end{pmatrix} = f(\hat{x}_k) = \begin{pmatrix} x_k + T \cdot v_k \cdot \cos\left(\psi_k + \frac{1}{2}\dot{\psi}_k \cdot T\right) \\ y_k + T \cdot v_k \cdot \sin\left(\psi_k + \frac{1}{2}\dot{\psi}_k \cdot T\right) \\ \psi_k + \dot{\psi}_k \cdot T \\ \frac{u_k + u_k}{2} \\ \dot{\psi}_k \end{pmatrix}$$

$$P_{k+1}^- = J_k P_k J_k^T + Q$$

Measurement Update

$$z_{k+1} = \begin{pmatrix} v_l \\ v_r \\ \delta \\ \dot{\psi} \end{pmatrix} = h(\hat{x}_{k+1}^-) = \begin{pmatrix} \text{sign}(v_{k+1}^-) \cdot \sqrt{\left(v_{k+1}^- - \frac{b}{2}\dot{\psi}_{k+1}^-\right)^2 + l^2 \cdot \dot{\psi}_{k+1}^{-2}} \\ \text{sign}(v_{k+1}^-) \cdot \sqrt{\left(v_{k+1}^- + \frac{b}{2}\dot{\psi}_{k+1}^-\right)^2 + l^2 \cdot \dot{\psi}_{k+1}^{-2}} \\ \arctan\left(\frac{l \cdot \dot{\psi}_{k+1}^-}{v_{k+1}^-}\right) \\ \dot{\psi}_{k+1}^- \end{pmatrix}$$

$$K_{k+1} = P_{k+1}^- H_{k+1}^T \left(H_{k+1} P_{k+1}^- H_{k+1}^T + R_{k+1}\right)$$

$$\hat{x}_{k+1} = \hat{x}_{k+1}^- + K_{k+1}\left(z_{k+1} - h(\hat{x}_{k+1}^-)\right)$$

Test Results
Hall Road / Van Dyke Ave

Test Results
Hall Road / Van Dyke Ave

Test Results
Opdyke Road / Featherstone Road

**Test Results
Opdyke Road / Featherstone Road**
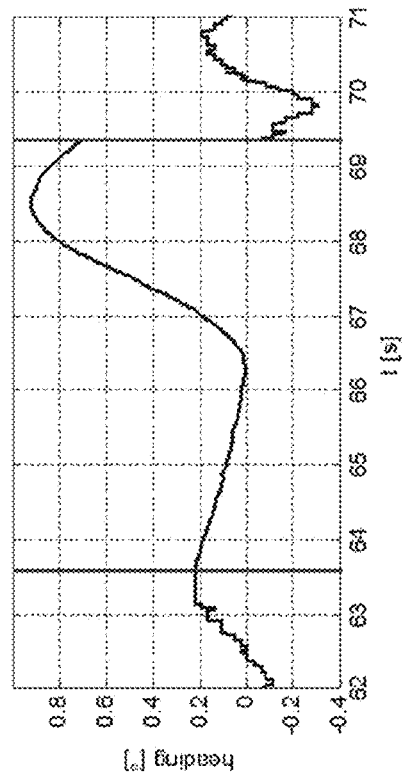
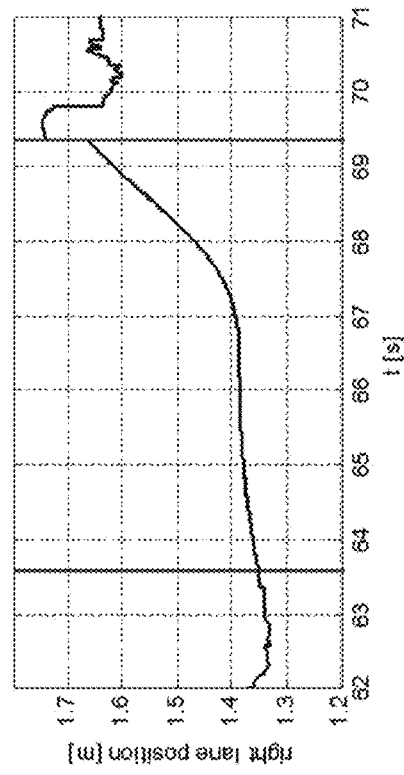
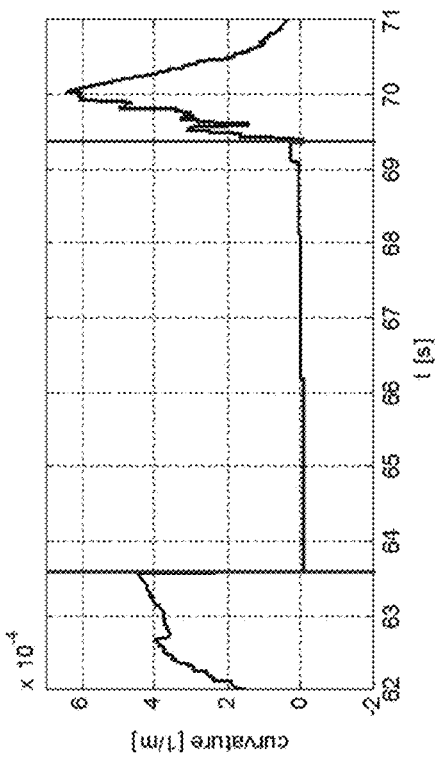
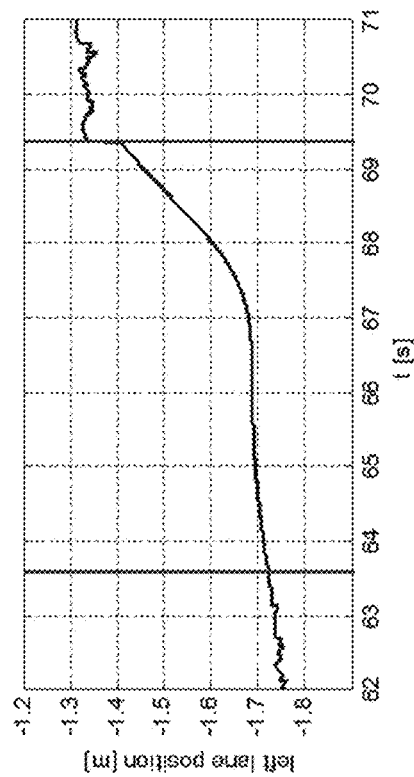
FIG. 22

**Test Results
Schoenherr Road / Hall Road**   FIG. 25

Test Results
Opdyke Road / Centerpoint Pkwy     FIG. 26

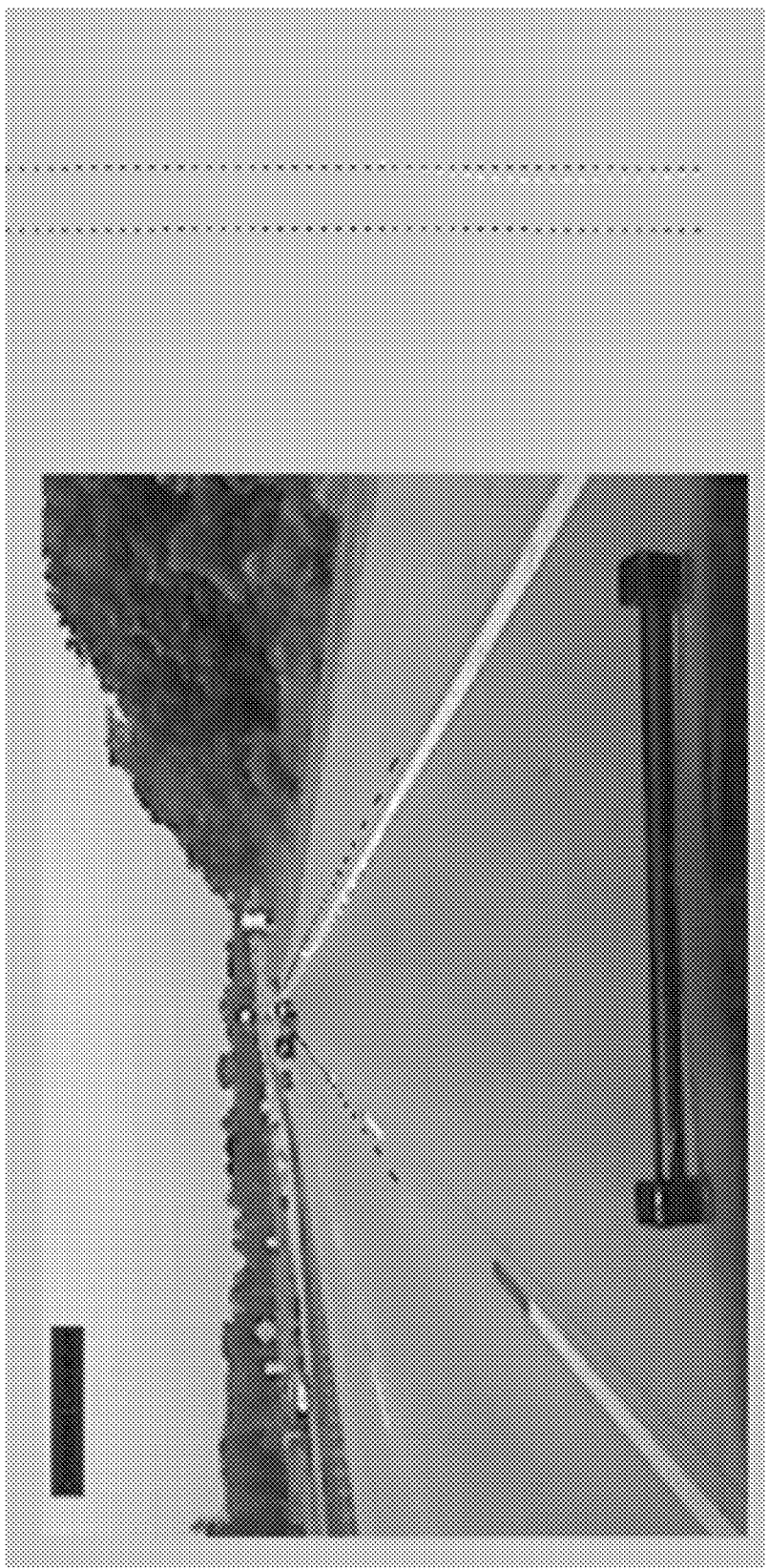

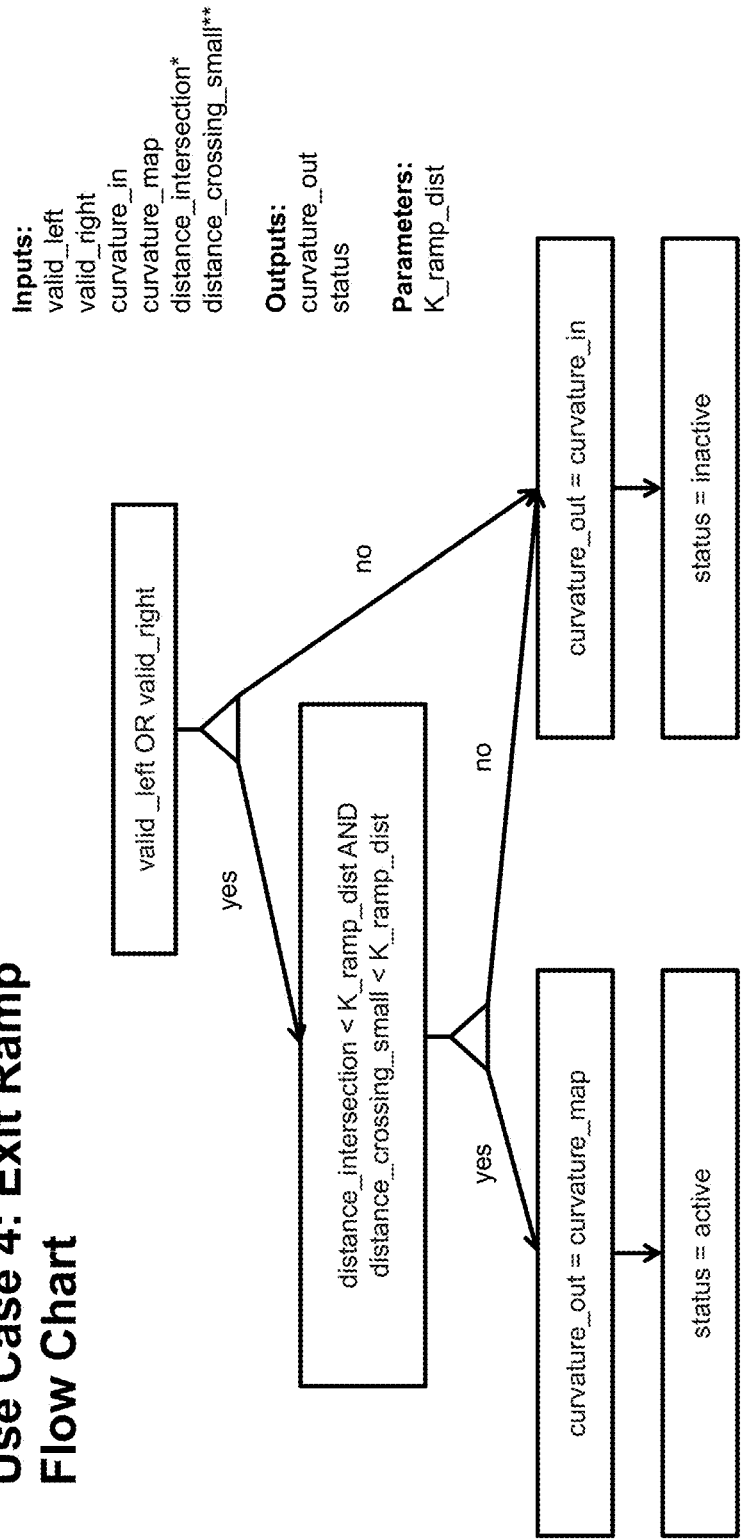

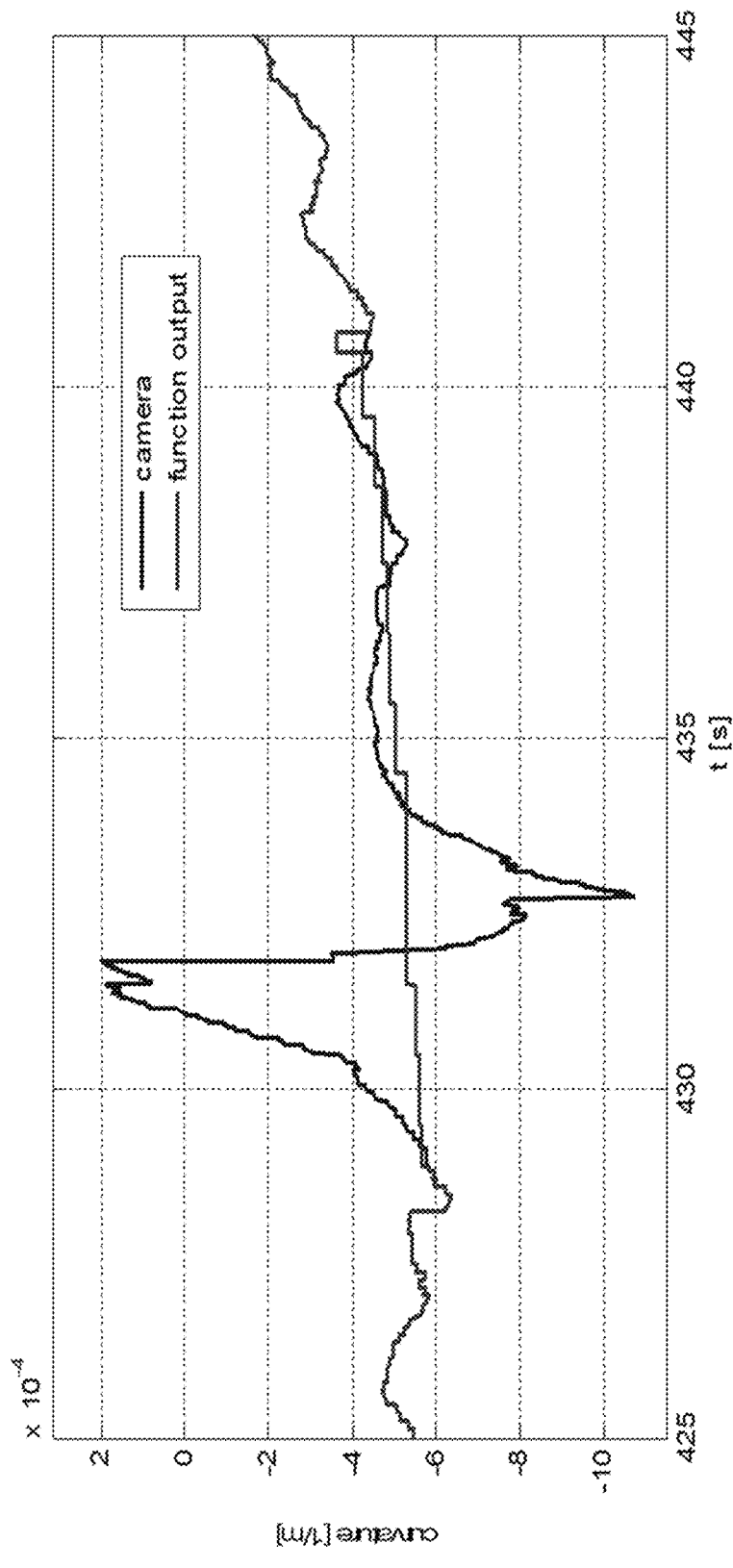

Use Case 4: Exit Ramp      FIG. 32

VEHICLE VISION SYSTEM WITH ENHANCED LANE TRACKING

CROSS REFERENCE TO RELATED APPLICATION

The present application claims the filing benefits of U.S. provisional application Ser. No. 62/305,216, filed Mar. 8, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides enhanced tracking of lanes along the road on which the vehicle is tracking, such as in situations where the camera loses the lane markings and/or tends to track the wrong lane markings and/or the like. The system utilizes additional inputs, such as vehicle inputs and geographical location inputs (such as GPS data and digital map data and the like) to enhance tracking and estimation of the lane along which the vehicle is traveling even in situations where the lane markers are not readily determinable by the camera and image processing.

The system of the present invention thus creates an abstraction layer between the image processing and the feature that would use the path (such as automated driving or the like). With the system of the present invention, the lane marker data from image processing of captured image data becomes one of the inputs to the new abstraction layer, rather than the sole supplier of path information. That image processing based input is combined with map data, GPS positioning data or information, differential wheel speeds, and/or the like, to determine where the desired path is ahead of the vehicle when the image-based determinations are not sufficient.

These and other objects, advantages, purposes and features of the present invention will become apparent upon review of the following specification in conjunction with the drawings.

BRIEF DESCRIPTION OF THE DRAWINGS

FIGS. 10-15 show application of the present invention to the first use case of FIG. 2;

FIGS. 16-26 show application of the present invention to the second use case of FIG. 3;

FIGS. 27-29 show application of the present invention to the third use case of FIG. 4; and FIGS. 30-32 show application of the present invention to the fourth use case of FIG. 5.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
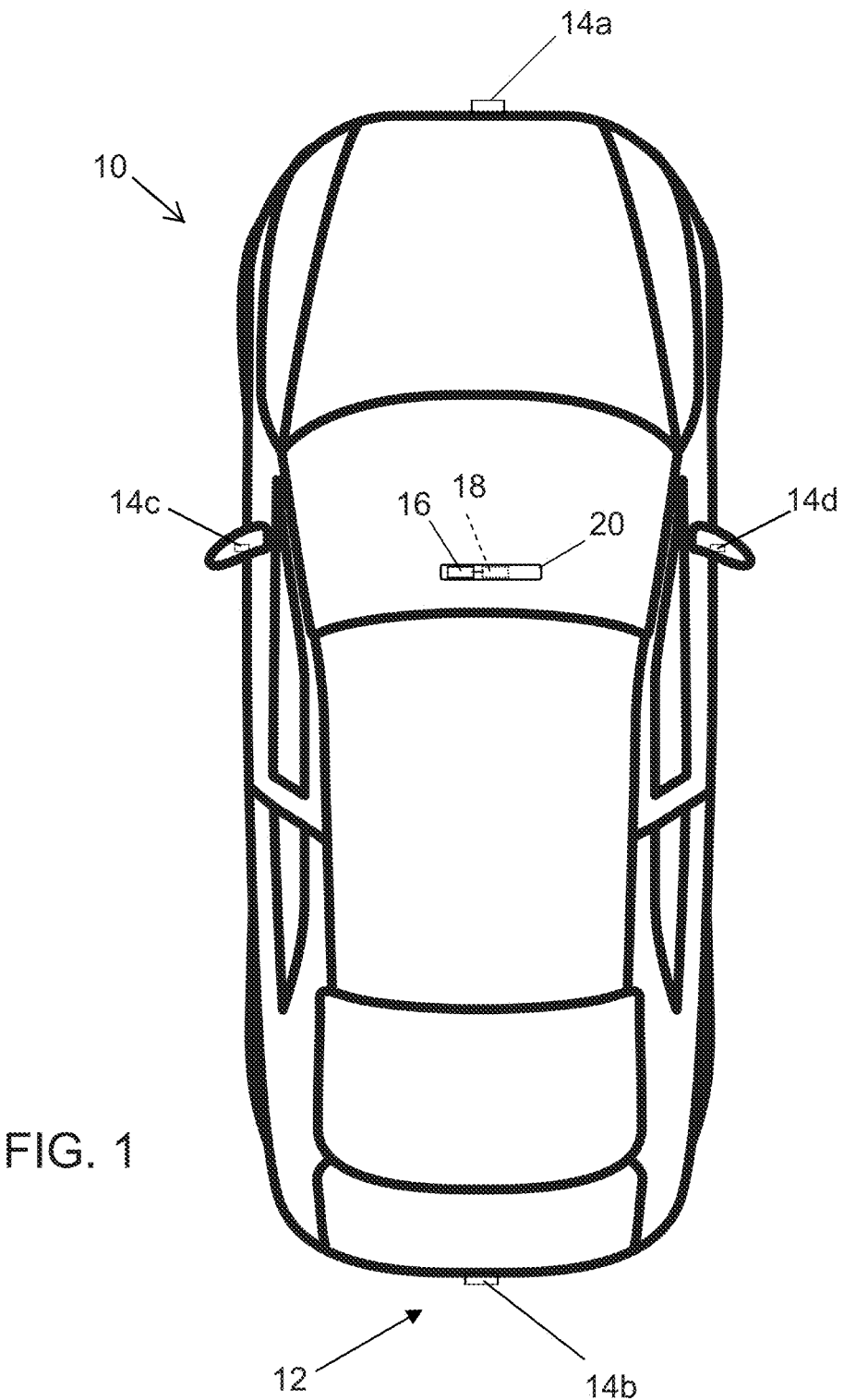
FIG. 1 is a plan view of a vehicle with a vision system that incorporates cameras in accordance with the present invention.
Figure 2:
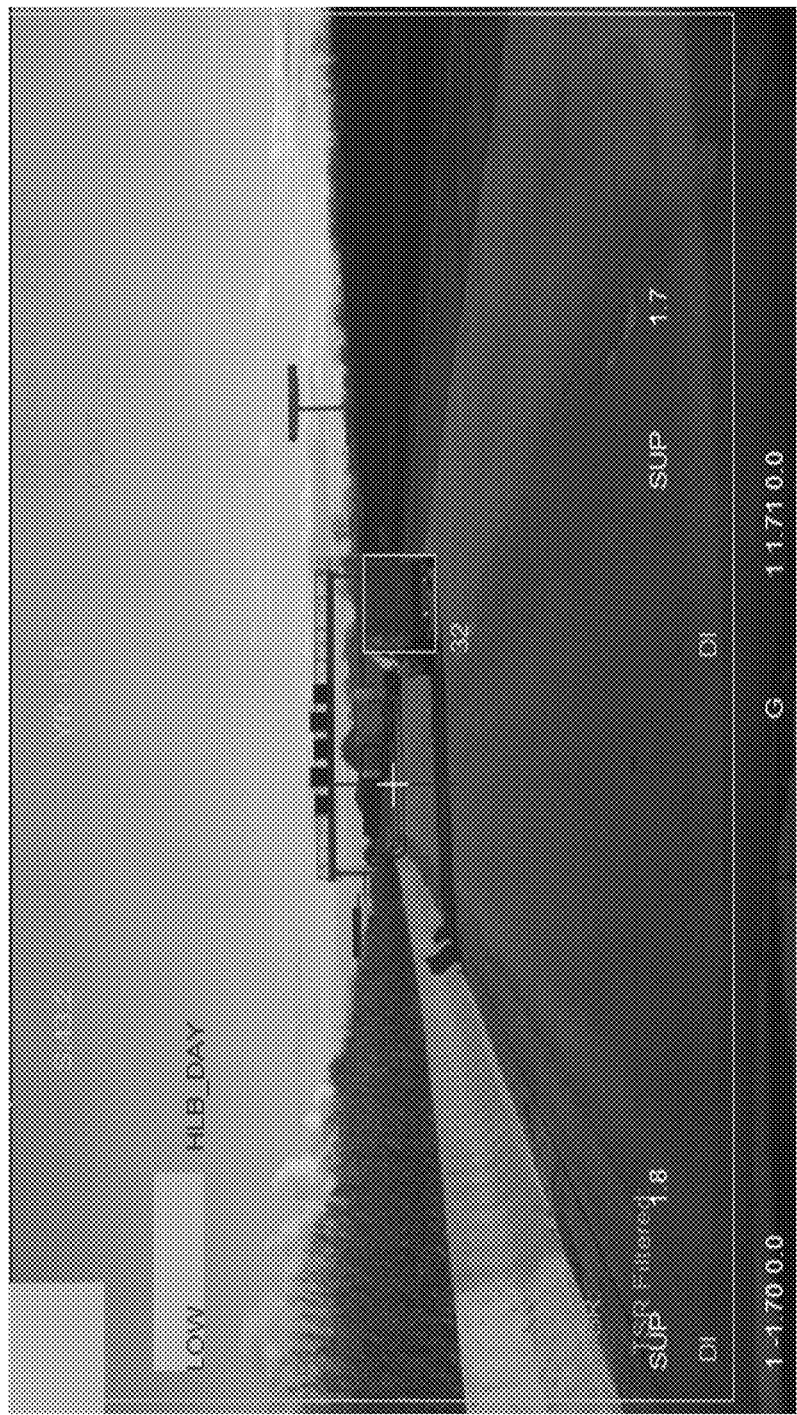
FIG. 2 is an image showing a use case where the camera loses the lane markings for a short period of time.
Figure 3:
FIG. 3 is an image showing a use case where the camera loses the lane markings for a short period of time at intersections.
Figure 4:
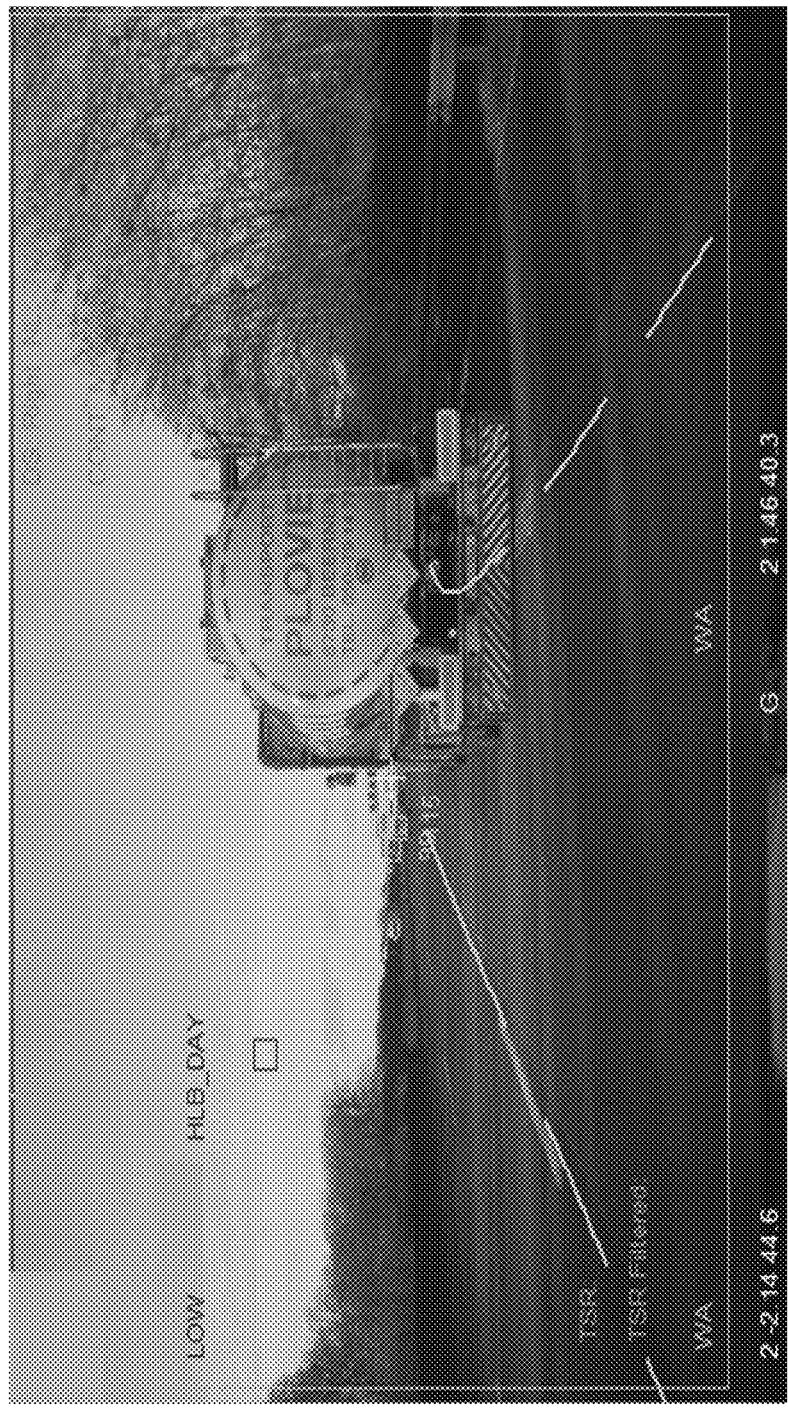
FIG. 4 is an image showing a use case where the camera may erroneously determine lane curvature.

Referring now to the drawings and the illustrative embodiments depicted therein, a vehicle 10 includes an imaging system or vision system 12 that includes at least one exterior facing imaging sensor or camera, such as a forward facing imaging sensor or camera 14a at a front portion of the vehicle or at and behind the windshield of the vehicle and viewing through the windshield, which captures images exterior and forward of the vehicle, with the camera having a lens for focusing images at or onto an imaging array or imaging plane or imager of the camera (FIG. 1). Optionally, the system may include multiple exterior facing imaging sensors or cameras, such as a rearwardly facing camera 14b at the rear of the vehicle, and a sidewardly/rearwardly facing camera 14c, 14d at respective sides of the vehicle, which capture images exterior of the vehicle. The forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Lane information determined from image data captured by a forward viewing camera is erroneous in some situations. The camera information can be corrected by using an independent data source. By means of fusion of lane information from the camera and from a digital map, the quality of lane information can be improved. This function can be utilized by multiple ADAS features, such as, for example, Automated Driving and/or the like.

The present invention provides enhanced lane tracking in situations where the lane markers may not be present or where the lane markers are not readily detectable by processing of captured image data (such as when the view of the lane markings by the camera is obstructed, such as due to another vehicle or object on the road or due to a curvature in the road or undulation in the road or the like). The system of the present invention defines use cases and collects test data, such as video clips and CAN recording of camera outputs, vehicle chassis CAN, GPS position and the like. The system checks test data for use cases and develops functions to improve path reckoning performance in defined use cases where lane marking detection becomes unreliable, such as by replaying recorded CAN data in simulation. Thus, when the system determines that the vehicle is currently in one of the defined use cases, the system may adjust the path estimation process to adapt to the current condition or situation, thus providing enhanced path estimation in various conditions or types of situations that are typically encountered by a vehicle on the road. Testing has shown that the system functions in simulation and in test drives in Germany and USA.

Figure 5:
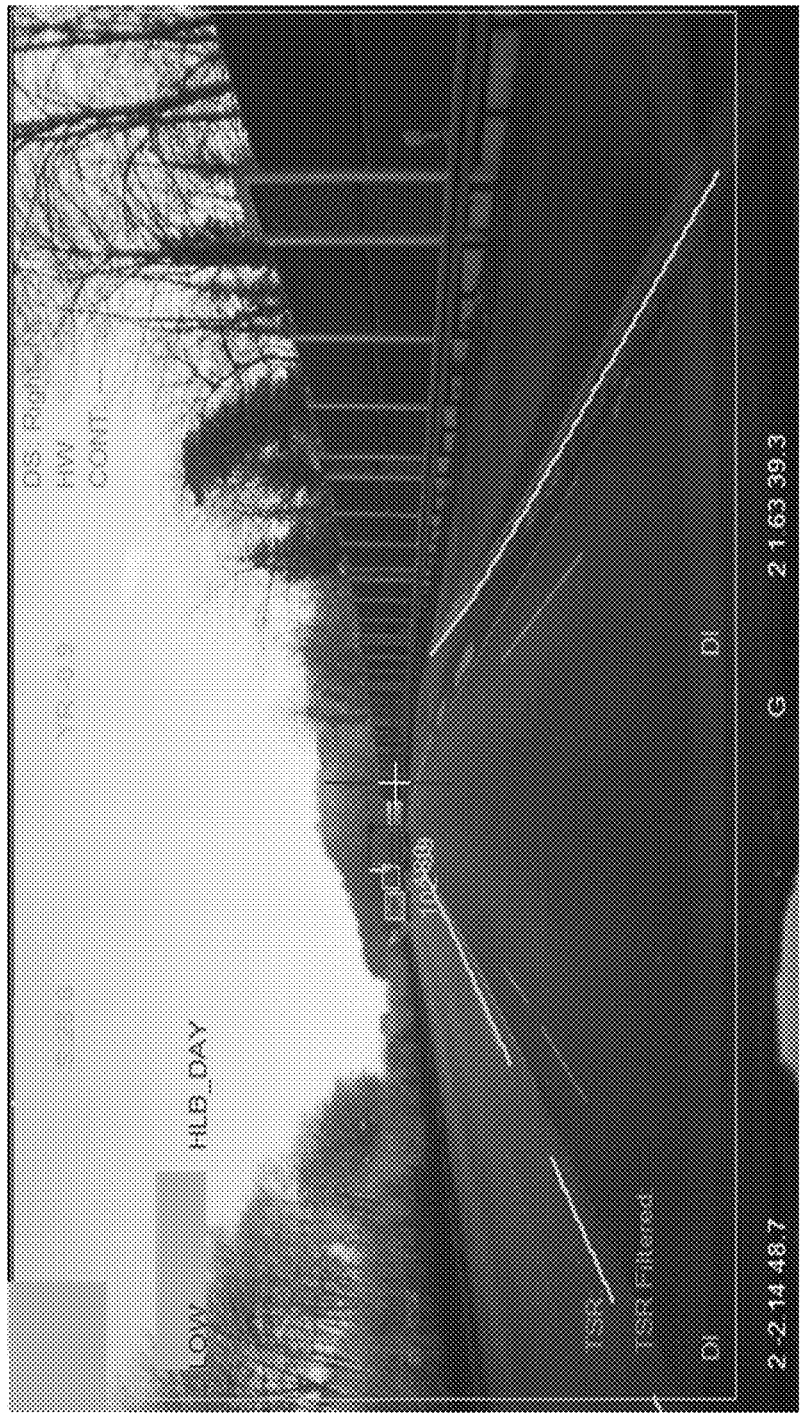
FIG. 5 is an image showing a use case where the camera may track the wrong lane markers, such as by tracking an exit lane instead of the correct road lane markers.

Some exemplary use cases are shown in FIGS. 2-5 and include cases where the camera loses the lane markings for a few seconds (FIG. 2), where the camera loses lane markings at intersections (FIG. 3), where the system erroneously estimates the lane curvature (FIG. 4), and where the camera tracks an exit lane instead of the correct lane marking (FIG. 5).

Figure 6:
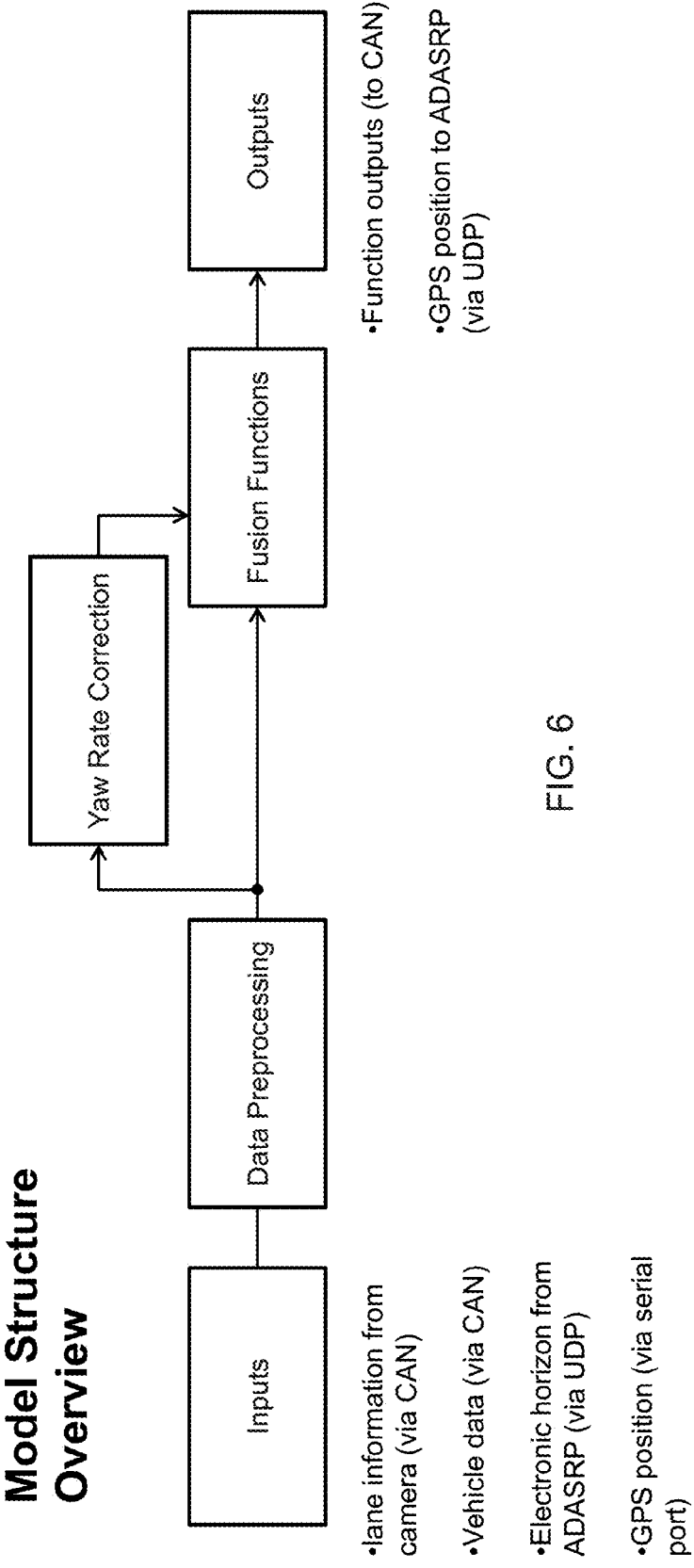
FIG. 6 is a block diagram of the system structure overview of the present invention.
Figure 7:
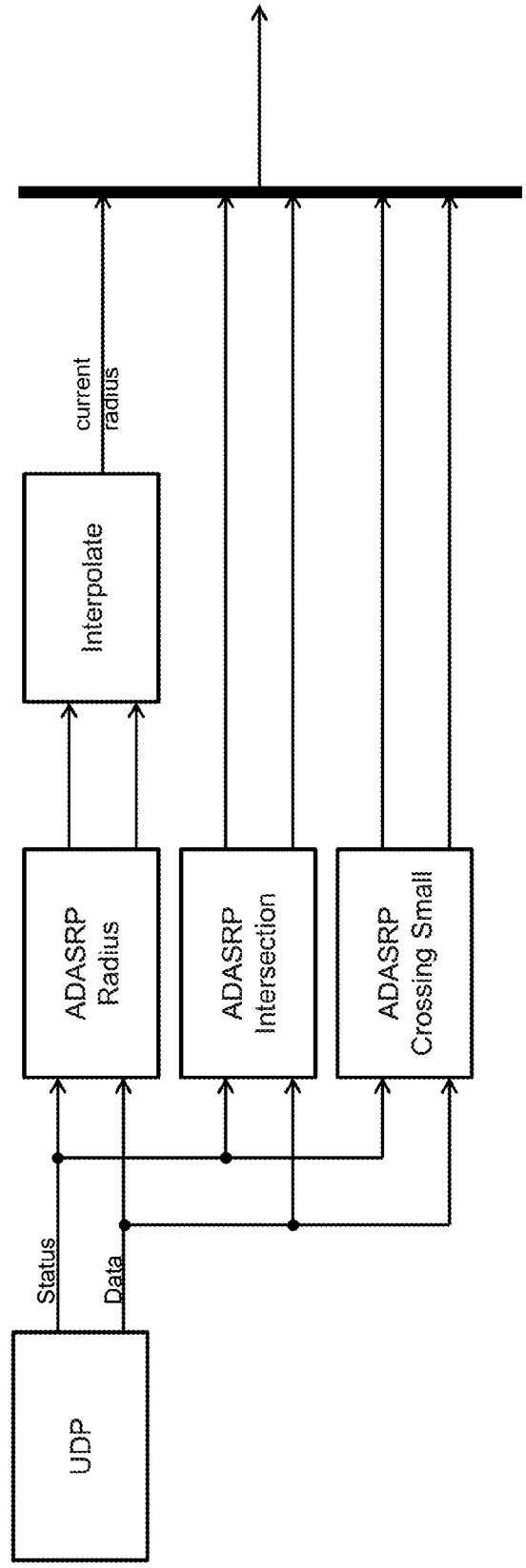
FIG. 7 is a schematic showing the data preprocessing of the system of the present invention.
Figure 8:
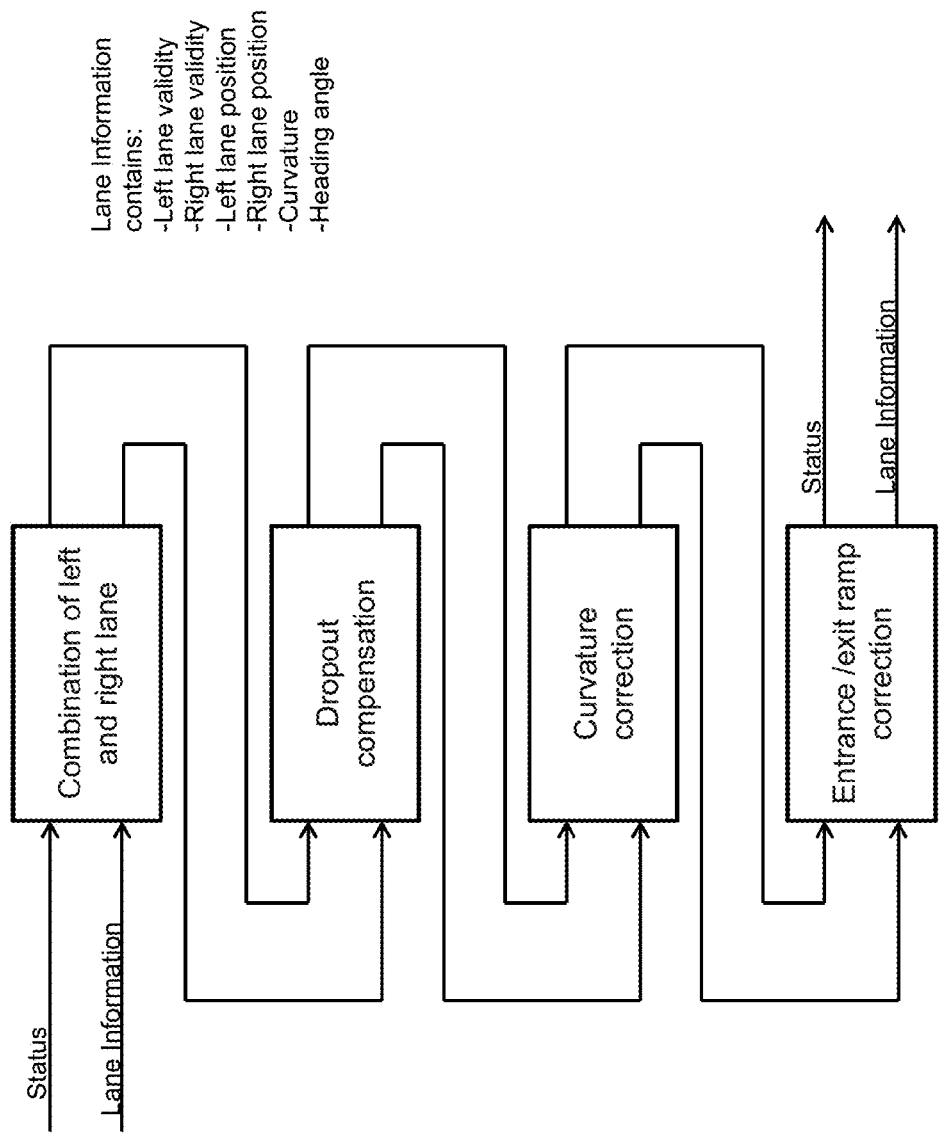
FIG. 8 is a schematic showing the fusion functions of the system of the present invention.
Figure 9:
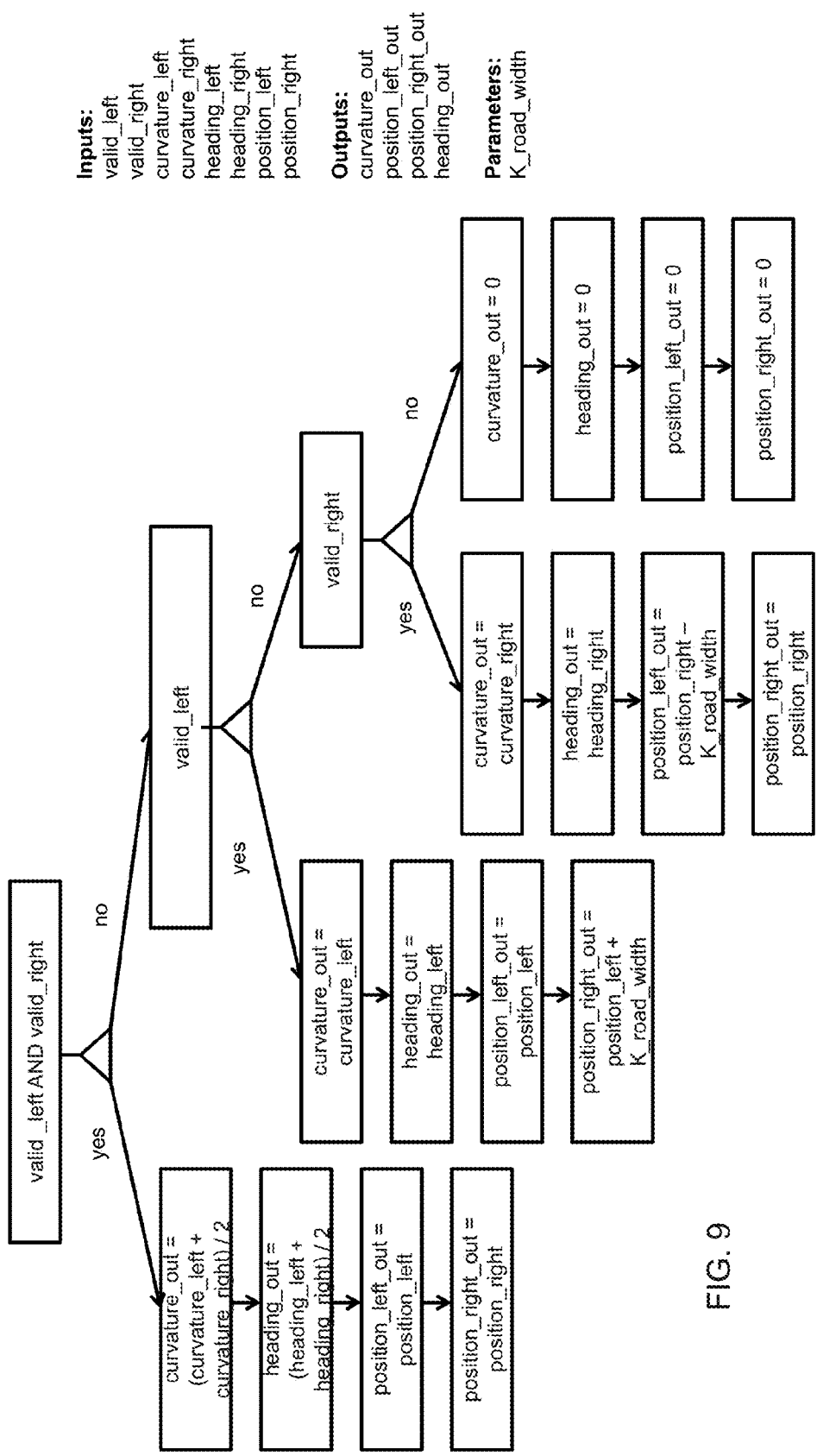
FIG. 9 is a schematic showing the process for determining the left lane and the right lane in accordance with the present invention.
Figure 10:
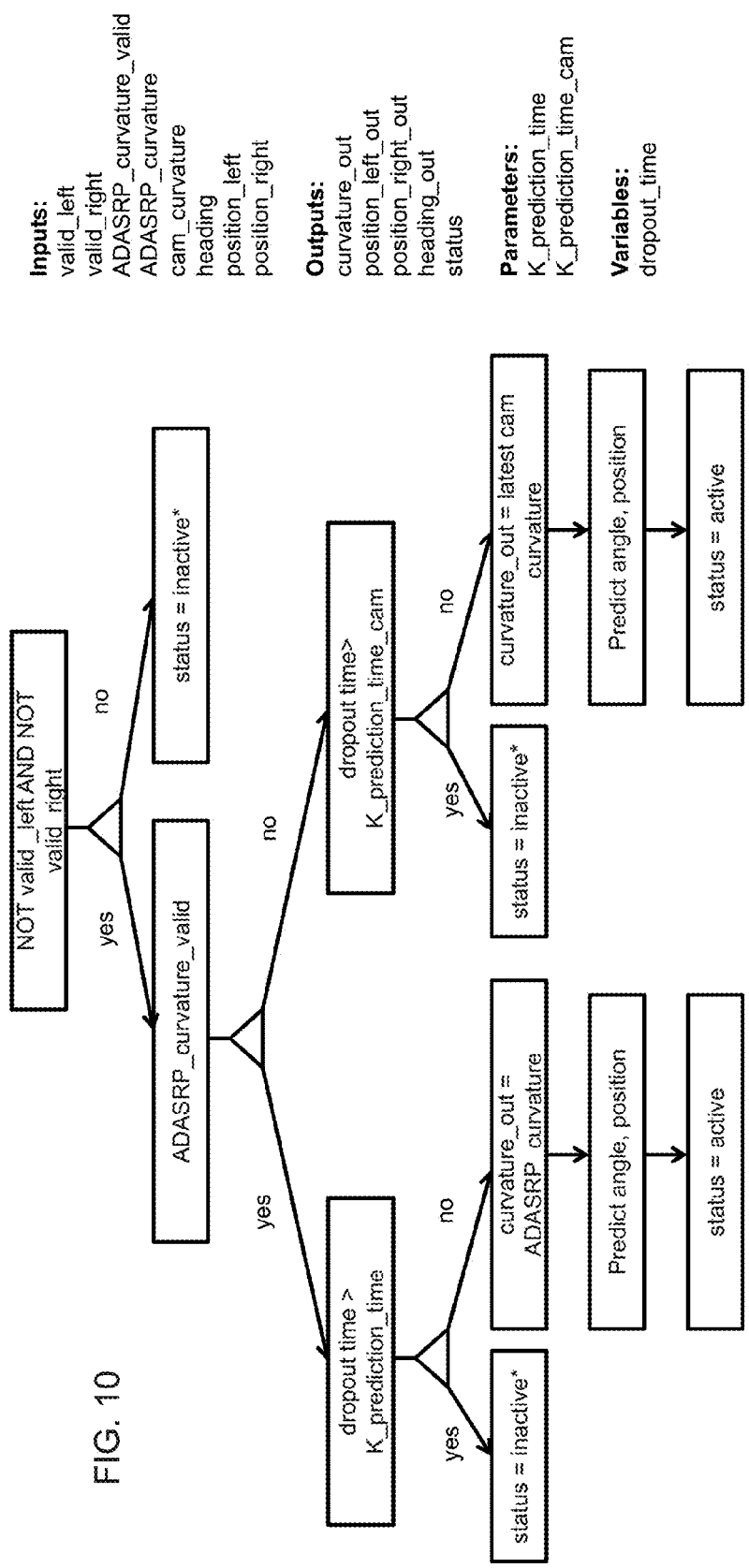
Figure 11:
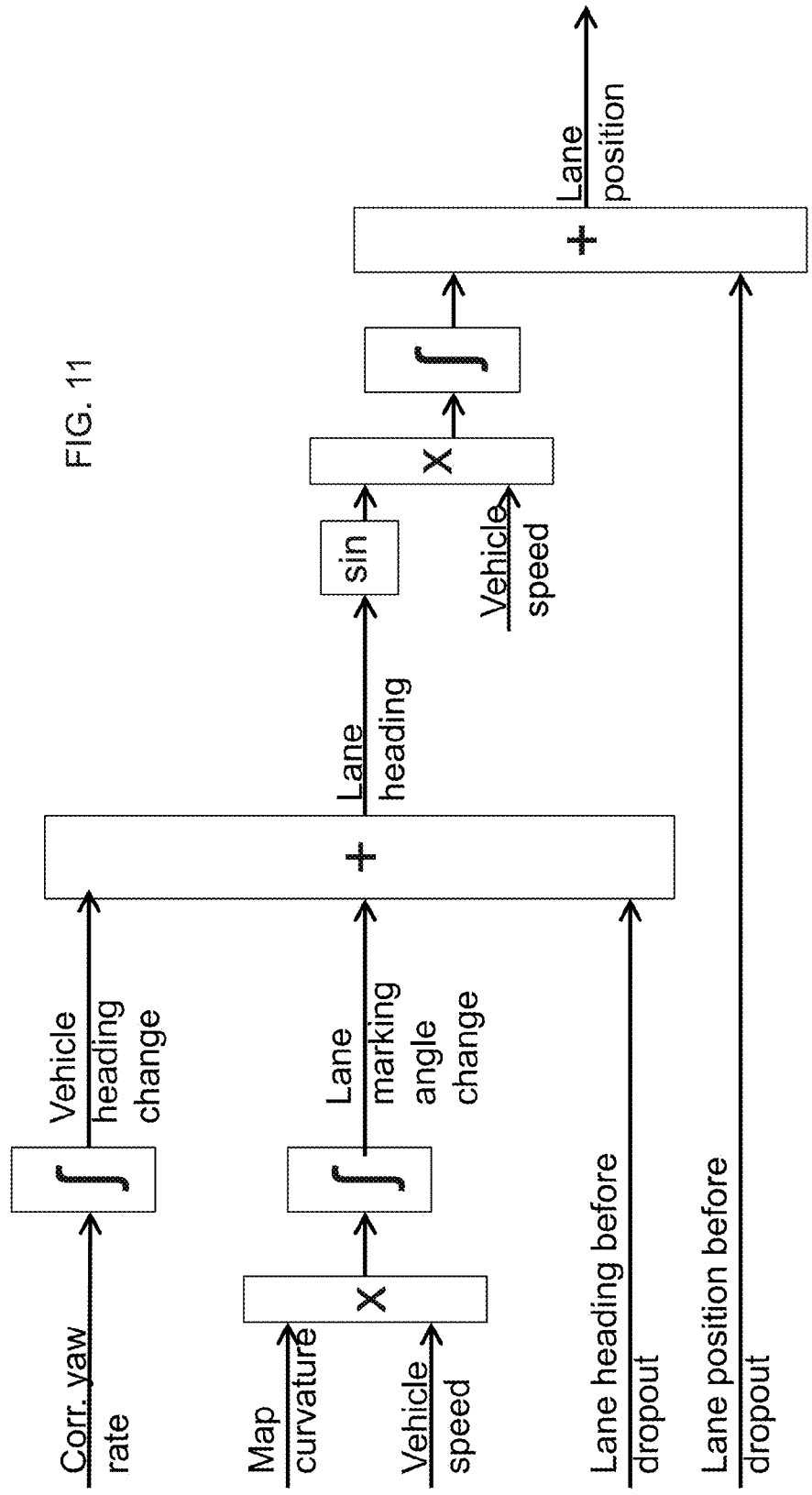

The system structure overview is shown in FIG. 6, and the data preprocessing of the system is shown in FIG. 7. In the data preprocessing, a map database (such as ADASRP or the like) provides electronic horizon for configurable preview distance (such as, for example, about one kilometer or thereabouts). For this preview distance, attribute values (such as, for example, the radius of the road ahead of the subject vehicle) are provided along with the distance to the current subject vehicle position. The distance values are updated at 1 Hz rate, and additional attribute values are transmitted when the preview distance falls below a desired value. The fusion functions of the system are shown in FIG. 8, and the process for determining the left lane and the right lane is shown in FIG. 9.

Figure 13:
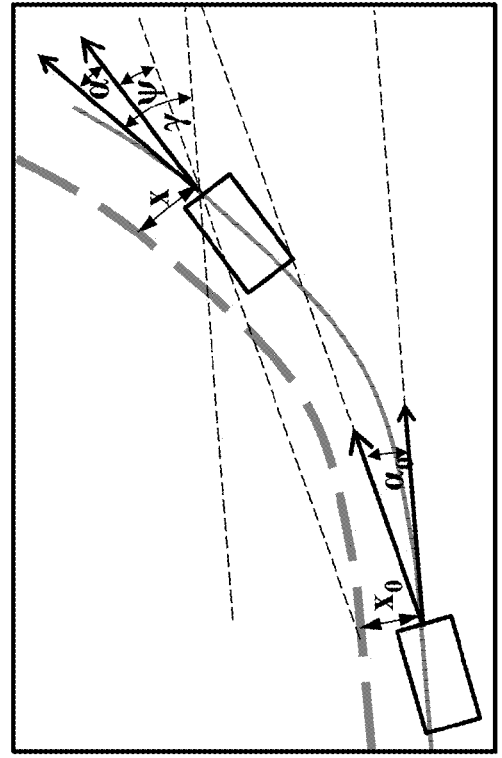
Figure 14:
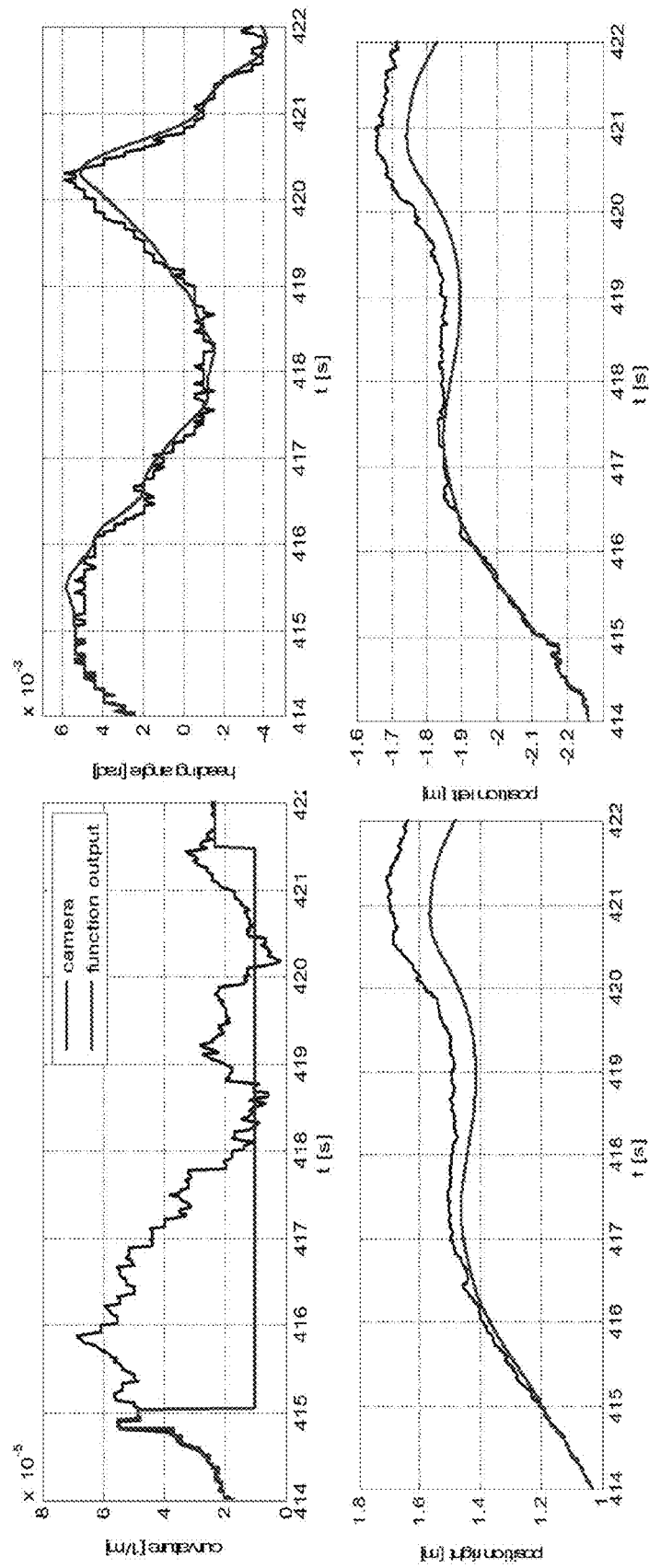
Figure 15:
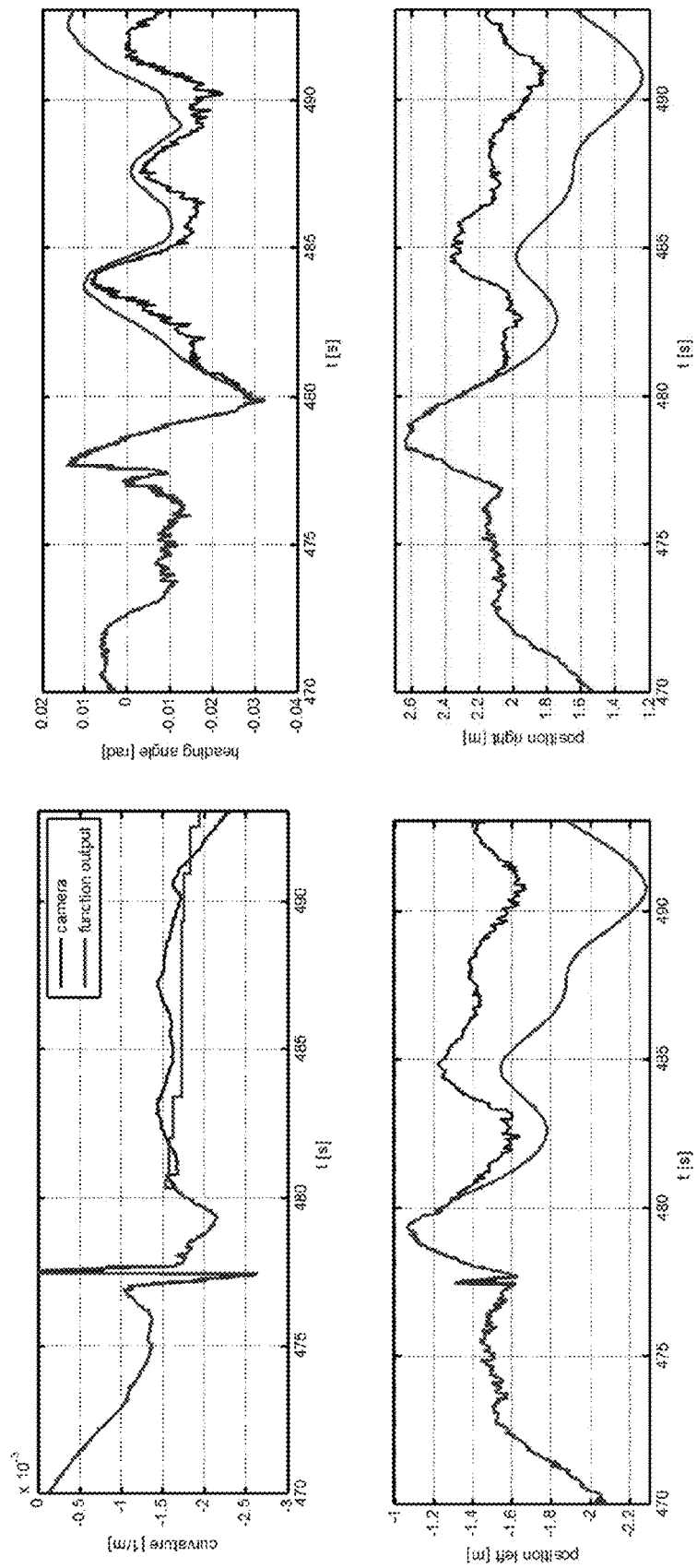

FIGS. 10-15 show application of the present invention to the first use case (FIG. 2), where the camera loses the lane markings for a few seconds. When such loss of lane markings occurs, the system predicts the lane heading responsive to a digital map, the latest heading from the camera before the loss, with changes calculated such as shown in FIGS. 12 and 13.

Figure 16:
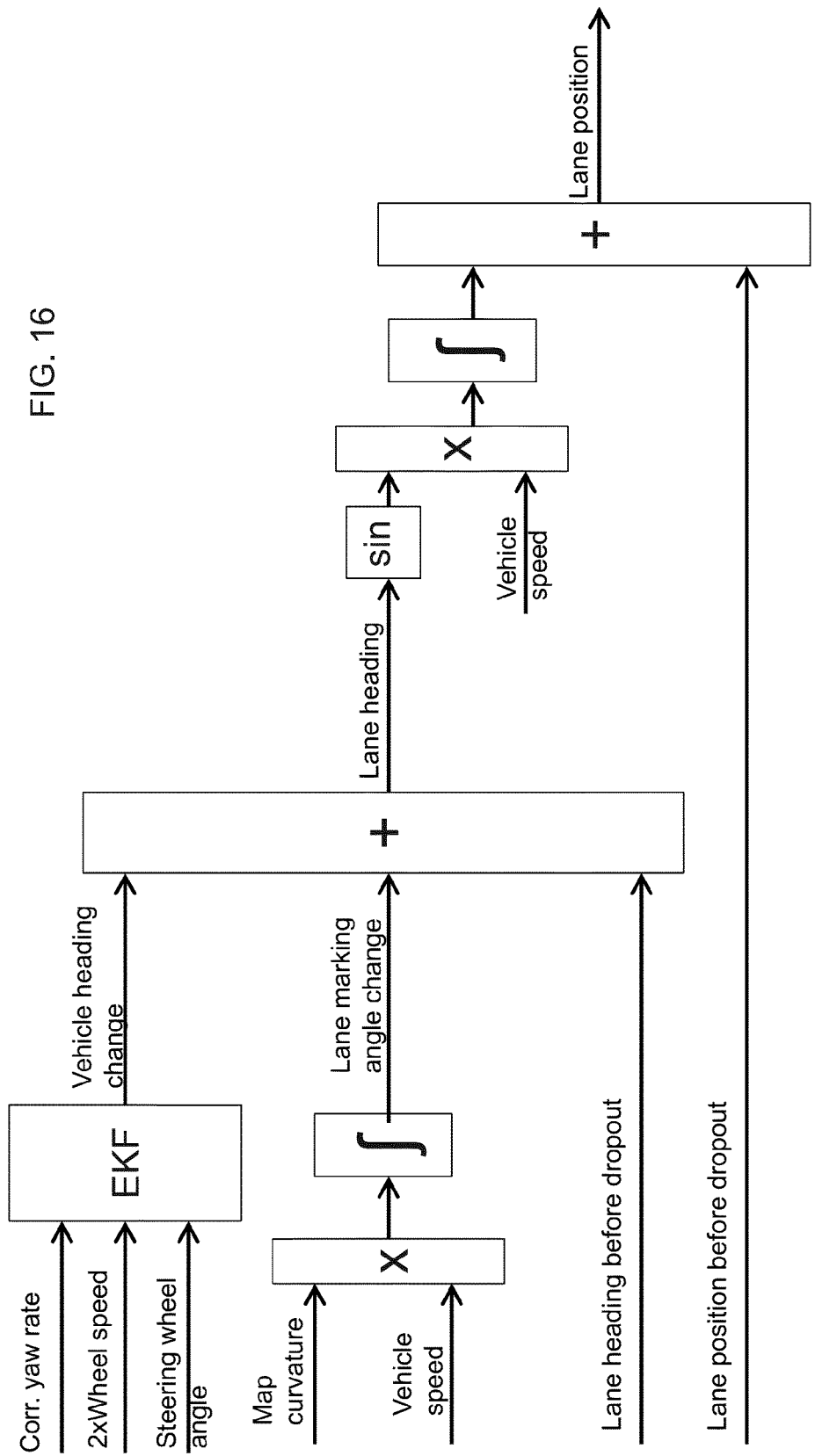
Figure 17:
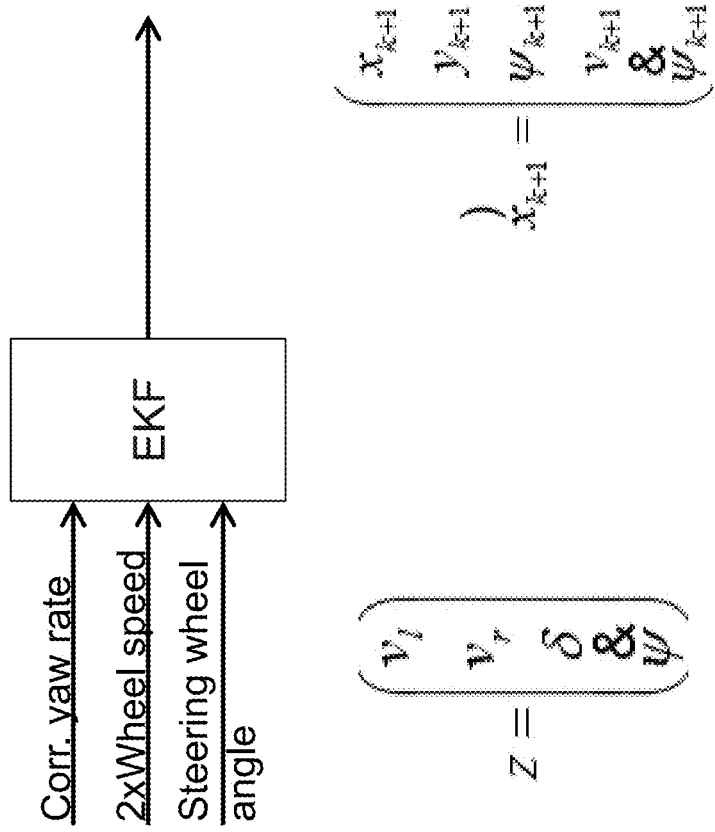
Figure 19:
Figure 20:
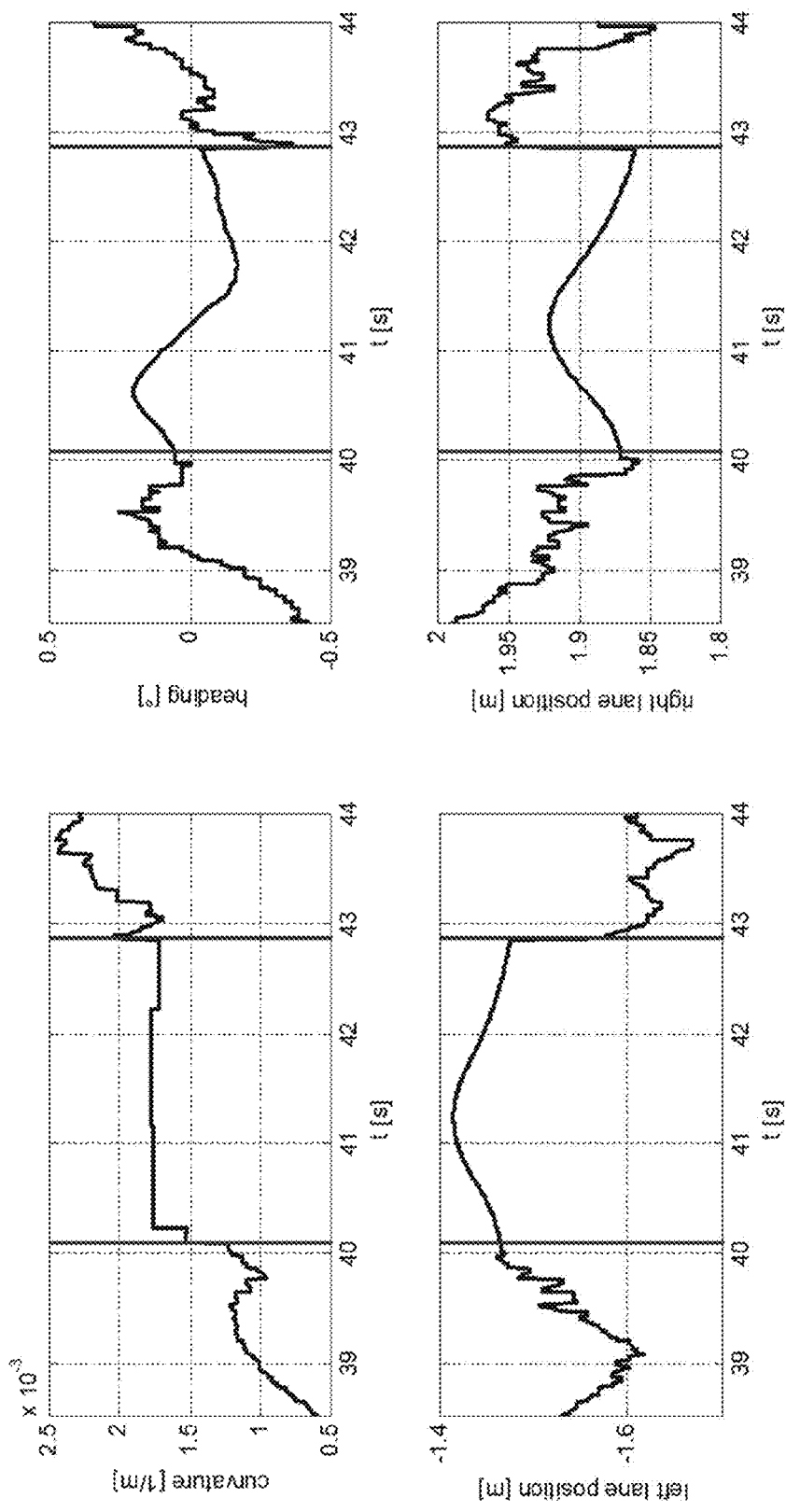
Figure 21:
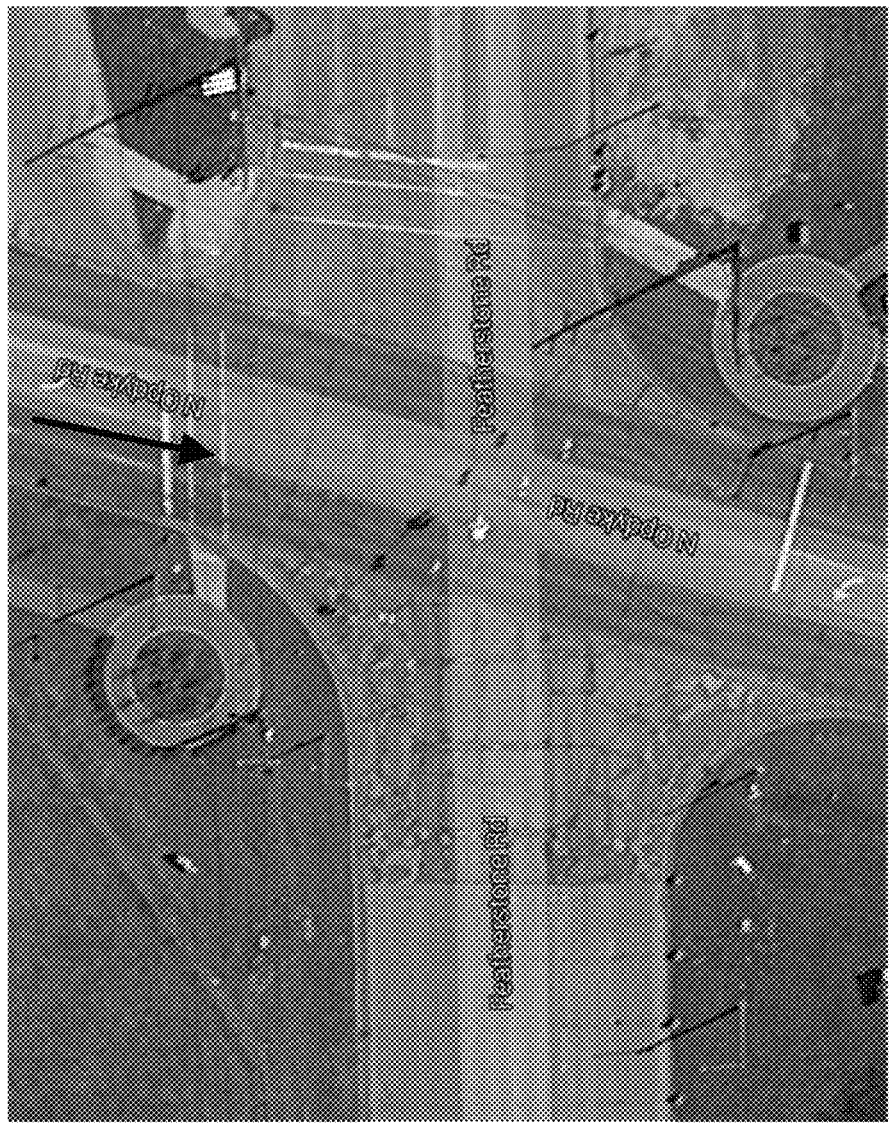
Figure 23:
Figure 24:
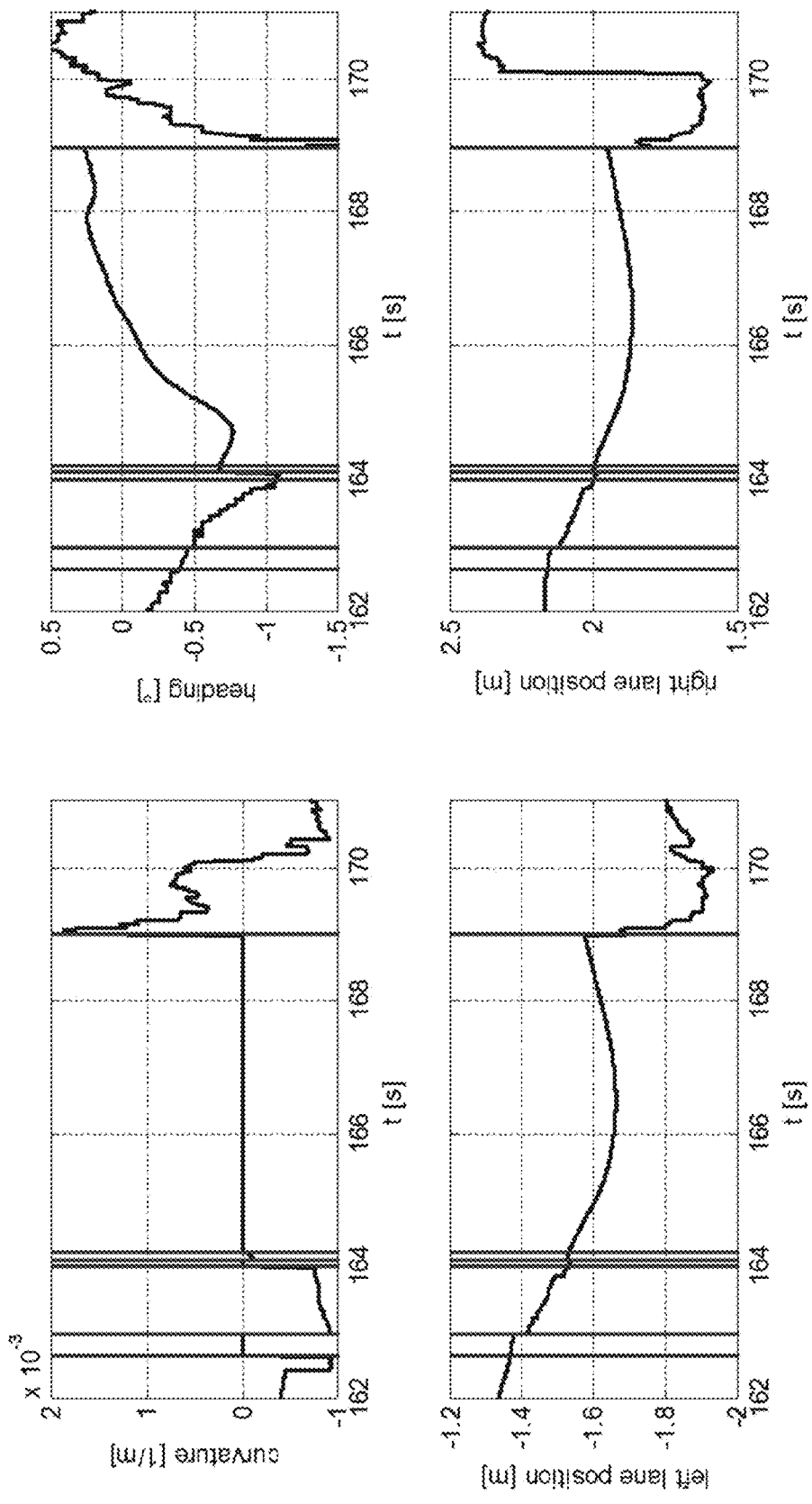
Figure 25:
Figure 26:

FIGS. 16-26 show application of the present invention to the second use case (FIG. 3), where the camera loses the lane markings at intersections. An enhanced dropout compensation algorithm has been developed based on use case 1 in order to compensate dropouts at intersections. The system and algorithm provide more accurate heading angle by using additional sensor data which are fused such as by means of an Extended Kalman Filter (EKF). The algorithm and heading angle estimation calculations are shown in FIGS. 16-18, and the results of test and parameterize algorithms in intersection scenarios are shown in FIGS. 19-26.

Figure 27:
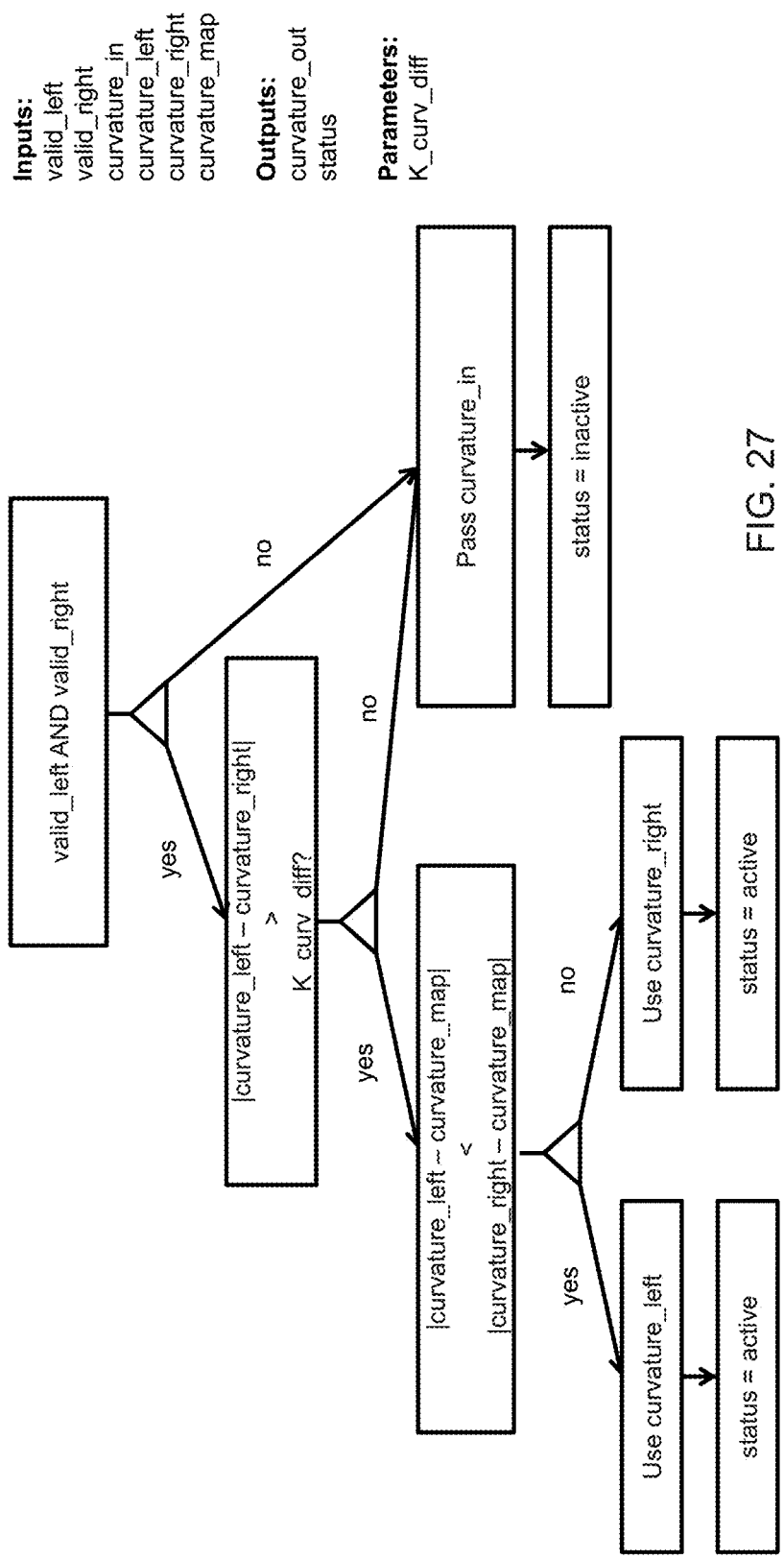
Figure 28:
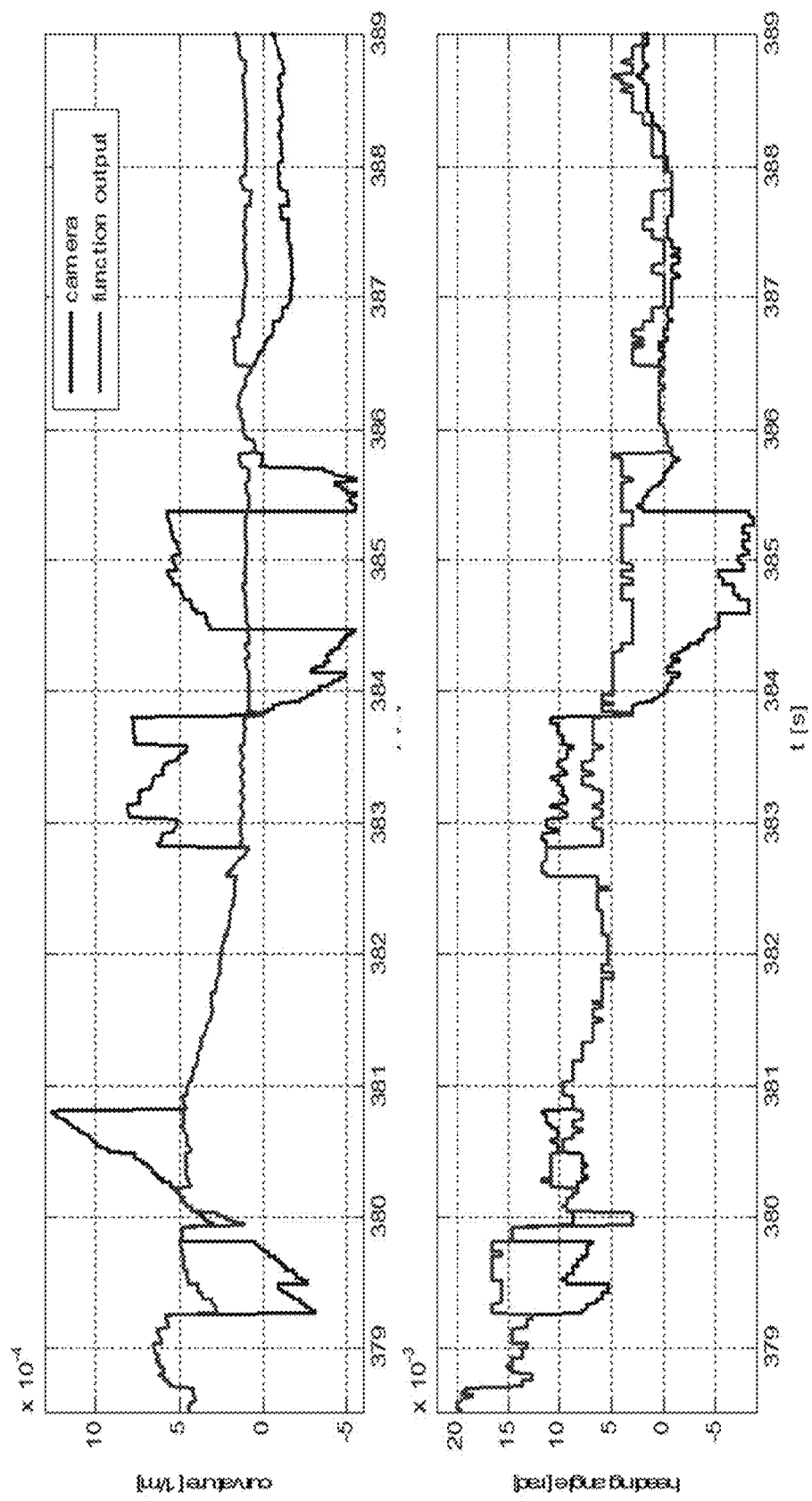

FIGS. 27-29 show application of the present invention to the third use case (FIG. 4), where the system erroneously estimates the lane curvature. The algorithm (see FIG. 27) determines whether or not to use the determined left and/or right curvatures to estimate the path of travel for the vehicle to maintain the vehicle in the lane it was traveling along.

FIGS. 30-32 show application of the present invention to the fourth use case (FIG. 5), where the camera tracks an exit lane instead of the correct lane marking. The algorithm (see FIG. 30) uses map data to determine distances (from the vehicle's current geographical location) to intersections or road crossings and determines whether or not a determined lane marking may be an exit lane marking to estimate the path of travel for the vehicle to maintain the vehicle in the lane it was traveling along.

Thus, the present invention provides enhanced tracking or estimation of lanes of the road on which the vehicle is traveling for situations where the camera or system loses the lane markings or may track the wrong lane markings. The system provides compensation of camera errors and increases the availability of automated driving functions (such as, for example, lane keeping or the like). The compensation of camera errors requires a map data base that has to be available in the vehicle. The algorithms to compensate for camera dropouts are not complex and thus the system of the present invention does not require high processing power. The system may utilize camera and navigation fusion functions, which may be implemented in the camera ECU or at a control unit of the vehicle that is separate from the camera (and that may communicate with the camera via a communication bus of the vehicle). The system may utilize a sensor CAN bus and a vehicle CAN bus, and may use inputs such as vehicle velocity and yaw rate and position and heading information and the like, along with GPS information pertaining to the vehicle location and the road along which the vehicle is traveling.

Therefore, the present invention provides a system that resolves some issues with lane data received from the image processing system, where there are situations like cresting a hill, crossing an intersection, passing entrance/exit ramps, or just unique situations where vehicles line up oddly with the lane markings and the image processing system may report bad data. For lane keeping (nudging at the marking) and particularly for lane centering (always active), it is important to have a good model of the path ahead. The system of the present invention thus creates an abstraction layer between the image processing and the feature that would use the path (such as automated driving or adaptive cruise control or the like). With the system of the present invention, the lane data from the image processing becomes one of the inputs to the new abstraction layer, rather than the sole supplier of path information. That input is combined with map data, GPS positioning data or information, differential wheel speeds, and/or the like, to determine where the desired path is ahead of the vehicle (even when lane markings are not present or are difficult to discern via image processing of captured image data). The vehicle is allowed to maneuver about this predicted or estimated path of travel and the path will update independently of the vehicle "virtually under the vehicle," even when no lane marking data is present ahead of the vehicle or discernible by the camera and image processing.

The present invention provides an abstraction layer that has the image processing lane output as one of the inputs. It also takes inputs from map data, GPS positioning, yaw rate, steering angle and differential wheel speeds (preferably non-driven wheels, but even 4wd vehicles can be taken into consideration). The system may determine objects on the road plane that obstruct the path. All of this is fused together to make a path reckoning system. The output of such a system provides an enhanced model of the path ahead of the subject vehicle. The system of the present invention is not a typical dead reckoning system that tries to maintain the vehicle's trajectory when the sensor data drops out. Instead, the present invention creates a path for the vehicle using multiple inputs that may drop out. The vehicle can move about on this path and the control system will still react to the path boundaries, even if there are no lane markings. Testing has found the system to be accurate to within about 10 cm of the actual lane markings after traveling as much as 100 meters. As shown in the drawings, FIGS. 20 and 22, bottom left graph, the lane data drop out is bounded between the vertical bars (at around 40 and 43 in FIG. 20 and at around 63.6 and 69.4 in FIG. 22). As the vehicle approaches the far side the lane markings come back and the error is about 0.1 m (which is about the width of a lane marking).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip such as a chip of the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. 2014/0340510; 2014/0313339; 2014/0347486; 2014/0320658; 2014/0336876; 2014/0307095; 2014/0327774; 2014/0327772; 2014/0320636; 2014/0293057; 2014/0309884; 2014/0226012; 2014/0293042; 2014/0218535; 2014/0218535; 2014/0247354; 2014/0247355; 2014/0247352; 2014/0232869; 2014/0218529; 2014/0211009; 2014/0160276; 2014/0168437; 2014/0168415; 2014/0160291; 2014/0152825; 2014/0139676; 2014/0138140; 2014/0104426; 2014/0098229; 2014/0085472; 2014/0067206; 2014/0049646; 2014/0052340; 2014/0025240; 2014/0028852; 2014/005907; 2013/0314503; 2013/0298866; 2013/0222593; 2013/0300869; 2013/0278769; 2013/0258077; 2013/0258077; 2013/0242099; 2013/0222592; 2013/0215271; 2013/0141578 and/or 2013/0002873, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925;

7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A driver assistance system for a vehicle, said driver assistance system comprising:
   a camera disposed at a vehicle and having a field of view forward of the vehicle;
   a control comprising an image processor that is operable to process image data captured by said camera;
   wherein, responsive to processing by said image processor of image data captured by said camera, said image processor is operable to determine lane markings demarcating the lane in which the vehicle is traveling;
   wherein, responsive to processing by said image processor of image data captured by said camera and responsive to at least one of (i) a map input from a digital map to said control and (ii) a location input from a global positioning system to said control, said control estimates a path of travel for the vehicle to maintain the vehicle in the lane in which the vehicle is traveling in situations where the lane markings demarcating the lane in which the vehicle is traveling are not readily determinable;
   wherein said control estimates the path of travel for the vehicle responsive to vehicle information, and wherein the vehicle information comprises at least one of (i) vehicle speed, (ii) vehicle differential wheel speeds and (iii) vehicle yaw rate;
   wherein said driver assistance system maneuvers the vehicle along the estimated path of travel; and
   wherein said driver assistance system updates the estimated path of travel ahead of the vehicle even when no lane markings are present on the road ahead of the vehicle.

2. The driver assistance system of claim 1, wherein, responsive to processing by said image processor of image data captured by said camera and responsive to at least one of (i) a map input from a digital map to said control and (ii) a location input from a global positioning system to said control, said control estimates the path of travel for the vehicle to maintain the vehicle in the lane in which the vehicle is traveling in situations where the lane markings demarcating the lane in which the vehicle is traveling are lost by said camera for a period of time.

3. The driver assistance system of claim 1, wherein, responsive to processing by said image processor of image data captured by said camera and responsive to at least one of (i) a map input from a digital map to said control and (ii) a location input from a global positioning system to said control, said control estimates the path of travel for the vehicle to maintain the vehicle in the lane in which the vehicle is traveling in situations where the lane markings demarcating the lane in which the vehicle is traveling are lost by said camera as the vehicle crosses an intersection.

4. The driver assistance system of claim 1, wherein, responsive to processing by said image processor of image data captured by said camera and responsive to at least one of (i) a map input from a digital map to said control and (ii) a location input from a global positioning system to said control, said control estimates the path of travel for the vehicle to maintain the vehicle in the lane in which the vehicle is traveling in situations where lane markings are erroneously determined by processing by said image processor of captured image data alone.

5. The driver assistance system of claim 1, wherein, responsive to processing by said image processor of image data captured by said camera and responsive to at least one of (i) a map input from a digital map to said control and (ii) a location input from a global positioning system to said control, said control estimates the path of travel for the vehicle to maintain the vehicle in the lane in which the vehicle is traveling in situations where processing by said image processor of image data alone determines lane markings that are not demarcating the lane in which the vehicle is traveling.

6. The driver assistance system of claim 1, wherein said control estimates the path of travel for the vehicle responsive to a location input from a global positioning system to said control that provides the vehicle's current geographical location information from the global positioning system of the vehicle.

7. The driver assistance system of claim 1, wherein said control estimates the path of travel for the vehicle responsive to a map input from a digital map to said control that provides road information pertaining to the road along which the vehicle is traveling.

8. The driver assistance system of claim 1, wherein, responsive to processing by said image processor of image data captured by said camera and responsive to a map input from a digital map to said control, said control estimates the path of travel for the vehicle to maintain the vehicle in the lane in which the vehicle is traveling in situations where the lane markings demarcating the lane in which the vehicle is traveling are not readily determinable.

9. The driver assistance system of claim 1, wherein, responsive to processing by said image processor of image data captured by said camera and responsive to a location input from a global positioning system to said control, said control estimates the path of travel for the vehicle to maintain the vehicle in the lane in which the vehicle is traveling in situations where the lane markings demarcating the lane in which the vehicle is traveling are not readily determinable.

* * * * *

UNITED STATES PATENT AND TRADEMARK OFFICE
CERTIFICATE OF CORRECTION

PATENT NO. : 10,055,651 B2
APPLICATION NO. : 15/446221
DATED : August 21, 2018
INVENTOR(S) : William J. Chundrlik, Jr. et al.

Page 1 of 1

It is certified that error appears in the above-identified patent and that said Letters Patent is hereby corrected as shown below:

In the Claims

Column 7
Line 60 Claim 1 "vehicle." should be --vehicle; and wherein said image processor adjusts processing by said image processor of image data captured by said camera responsive at least in part to a type of driving situation that the vehicle is in.--

Signed and Sealed this
Thirteenth Day of November, 2018

Andrei Iancu
*Director of the United States Patent and Trademark Office*